US012608029B2

(12) United States Patent
Nam et al.

(10) Patent No.: US 12,608,029 B2
(45) Date of Patent: Apr. 21, 2026

(54) POWER MANAGEMENT DEVICE AND ELECTRONIC DEVICE INCLUDING THE SAME

(71) Applicant: Samsung Electronics Co., Ltd., Suwon-si (KR)

(72) Inventors: Hyunseok Nam, Suwon-si (KR); Minshik Seok, Suwon-si (KR); Daehan Yu, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 202 days.

(21) Appl. No.: 18/523,424

(22) Filed: Nov. 29, 2023

(65) Prior Publication Data

US 2025/0021119 A1 Jan. 16, 2025

(30) Foreign Application Priority Data

Jul. 10, 2023 (KR) ........................ 10-2023-0088818

(51) Int. Cl.
*G05F 1/56* (2006.01)

(52) U.S. Cl.
CPC ...................................... *G05F 1/56* (2013.01)

(58) Field of Classification Search
CPC ........................................................ G05F 1/56
See application file for complete search history.

(56) References Cited

U.S. PATENT DOCUMENTS

| | | | | |
|---|---|---|---|---|
| 6,429,706 | B1 | 8/2002 | Amin et al. | |
| 6,735,704 | B1 | 5/2004 | Butka et al. | |
| 7,337,342 | B1 | 2/2008 | O'Brien | |
| 10,936,049 | B2 * | 3/2021 | Mocanu | G06F 3/0604 |
| 11,275,394 | B2 | 3/2022 | Seok et al. | |
| 11,374,486 | B2 | 6/2022 | Zhou et al. | |
| 12,326,775 | B2 * | 6/2025 | Bettine | G11C 7/24 |
| 2013/0076149 | A1 | 3/2013 | Yu et al. | |
| 2021/0271276 | A1 * | 9/2021 | Seok | G06F 1/3203 |
| 2023/0019075 | A1 | 1/2023 | Seok et al. | |

* cited by examiner

*Primary Examiner* — Rafael O De Leon Domenech
(74) *Attorney, Agent, or Firm* — Harness, Dickey & Pierce, P.L.C.

(57) ABSTRACT

A power management device includes a main power management integrated circuit (PMIC) and at least one sub PMIC that communicates with the main PMIC through a dedicated pin. The main PMIC includes a first pin, enables first functions associated with a first initial operation based on a battery voltage during a stand-by period before generating first output voltages based on the battery voltage and applies a first sub enable signal to the at least one sub PMIC through the first pin based on a power-on signal after completing the first initial operation. The at least one sub PMIC includes a second pin, receives the first sub enable signal through the second pin and enables second functions associated with a second initial operation based on the battery voltage, in response to an activation of the first sub enable signal.

20 Claims, 24 Drawing Sheets

1000

1000

10

10

10

10a

10b

20

30

POWER MANAGEMENT DEVICE AND ELECTRONIC DEVICE INCLUDING THE SAME

CROSS-REFERENCE TO RELATED APPLICATION

This application claims priority to and the benefit of, under 35 USC § 119, Korean Patent Application No. 10-2023-0088818, filed on Jul. 10, 2023, in the Korean Intellectual Property Office, the disclosure of which is incorporated by reference herein in its entirety.

TECHNICAL FIELD

Example embodiments relate to semiconductor devices, and more particularly, to power management devices including a plurality of power management integrated circuits PMICs and electronic devices including the same.

DISCUSSION OF THE RELATED ART

A system on chip (SoC) indicates a technology of integrating various functional blocks such as a central processing unit (CPU), a memory, a digital signal processing circuit, and/or an analog signal processing circuit, into one semiconductor integrated circuit or one integrated circuit integrated according to the technology. An SoC is developed to a further complex system including a processor, multimedia, graphics, security, and the like. An SoC embedded in mobile devices, such as smartphones and tablet PCs, etc., includes a PMIC in response to an increase in demand for the power necessary for various functions of the mobile device, as well as for efficient power management. The PMIC performs a power conversion function and a power sequence function for outputting various output voltages to voltage rails.

When circuits in the PMIC are too large, an increased physical footprint size may cause a high operation cost due to reasons such as, circuit layout challenges, external component placement congestion, thermal density challenges, and/or increased complexity of the PMIC design, etc. When reaching a PMIC physical size limit, an SoC may employ multiple PMICs. The multiple PMICs may disperse the thermal load and allow external components to be easily placed.

SUMMARY

Example embodiments provide a power management device capable of reducing current consumption in a stand-by period.

Example embodiments provide an electronic device including a power management device capable of reducing current consumption in a stand-by period.

According to some example embodiments, a power management device includes a main power management integrated circuit (PMIC) and at least one sub PMIC configured to communicate with the main PMIC through a dedicated pin. The main PMIC includes a first pin and is configured to enable first functions associated with a first initial operation based on a battery voltage during a stand-by period before generating first output voltages based on the battery voltage, and apply a first sub enable signal to the at least one sub PMIC through the first pin based on a power-on signal after completing the first initial operation. The at least one sub PMIC includes a second pin and is configured to receive the first sub enable signal through the second pin, and enable second functions associated with a second initial operation based on the battery voltage, in response to an activation of the first sub enable signal.

According to some example embodiments, an electronic device includes a main processor including a plurality of first power domains, and a power management device configured to generate a plurality of output voltages in association with a power sequence of the plurality of first power domains, and provide the plurality of output voltages to the plurality of first power domains through voltage rails. The power management device includes a main power management integrated circuit (PMIC) configured to communicate with the main processor through a system bus, and at least one sub PMIC configured to communicate with the main PMIC through a dedicated pin. The main PMIC includes a first pin and is configured to enable first functions associated with a first initial operation during a stand-by period before generating first output voltages based on a battery voltage, and apply a first sub enable signal to the at least one sub PMIC through the first pin based on a power-on signal after completing the first initial operation. The at least one sub PMIC includes a second pin and is configured to receive the first sub enable signal through the second pin, and enable second functions associated with a second initial operation based on the battery voltage, in response to an activation of the first sub enable signal.

According to some example embodiments, a power management device includes a main power management integrated circuit (PMIC) and at least one sub PMIC configured to communicate with the main PMIC through a dedicated pin. The main PMIC includes a first pin and is configured to enable first functions associated with a first initial operation during a stand-by period before generating first output voltages based on a battery voltage, and apply a sub enable signal to the at least one sub PMIC through the first pin based on a power-on signal after completing the first initial operation. The at least one sub PMIC includes a second pin and is configured to receive the sub enable signal through the second pin, and enable second functions associated with a second initial operation based on the battery voltage, in response to an activation of the sub enable signal. The main PMIC is configured to generate a reference voltage based on the battery voltage in response to the battery voltage reaching a reference level, activate the sub enable signal in response to the reference voltage reaching a target level and an activation of the power-on signal, and apply the sub enable signal to the at least one sub PMIC through the first pin.

Accordingly, in some example embodiments, in the power management device including the main PMIC and the plurality of sub PMICs, the main PMIC activates a sub enable signal after enabling functions associated with initial operation and applies the sub enable signal that is activated to the plurality of sub PMICs to enable functions associated with initial operation of the plurality of sub PMICs concurrently or sequentially. Therefore, the power management device may reduce current consumed during the stand-by mode.

BRIEF DESCRIPTION OF THE DRAWINGS

The above and other features of the present inventive concepts will become more apparent by describing some example embodiments thereof with reference to the accompanying drawings.

DETAILED DESCRIPTION

Figure 1:
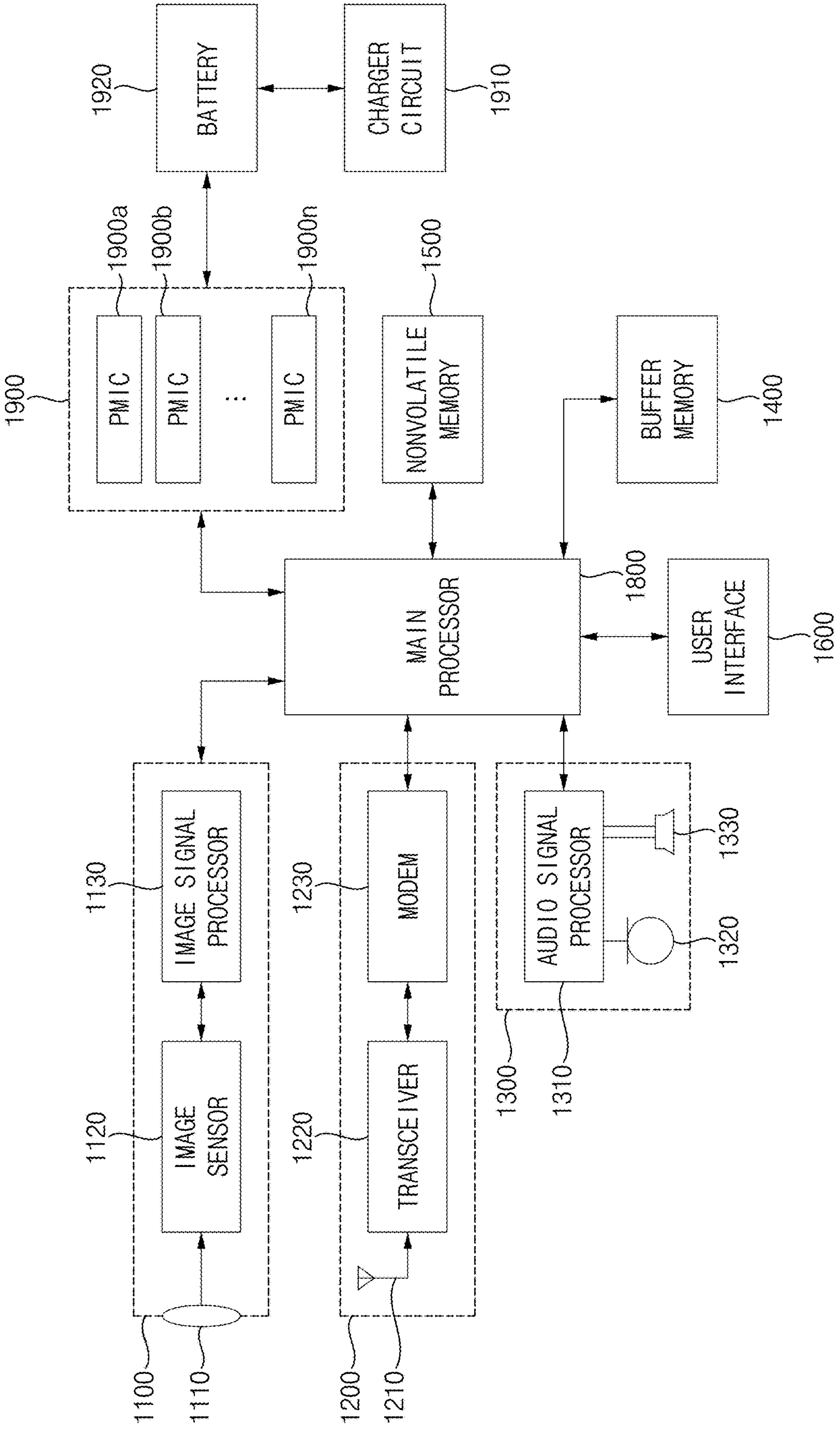
FIG. 1 is a block diagram illustrating an example of an electronic device according to some example embodiments.

Example embodiments of the present inventive concepts will be described more fully hereinafter with reference to the accompanying drawings. Like reference numerals may refer to like elements throughout the accompanying drawings.

It will be understood that when an element such as a layer, film, region, or substrate is referred to as being "on" another element, it may be directly on the other element or intervening elements may also be present. In contrast, when an element is referred to as being "directly on" another element, there are not intervening elements present. It will further be understood that when an element is referred to as being "on" another element, it may be above or beneath or adjacent (e.g., horizontally adjacent) to the other element.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., +10%) around the stated elements and/or properties thereof.

FIG. 1 is a block diagram illustrating an example of an electronic device according to some example embodiments.

Referring to FIG. 1, an electronic device 1000 may include various electronic circuits. For example, the electronic circuits of the electronic device 1000 may include an image processing block 1100, a communication block 1200, an audio processing block 1300, a buffer memory 1400, a nonvolatile memory 1500, a user interface 1600, a main processor 1800, a power management device 1900, and a charger circuit 1910.

The electronic device 1000 may be implemented with any computing device or any mobile/portable device, such as a mobile phone, a smart phone, a tablet computer, a laptop computer, a personal digital assistants (PDA), an enterprise digital assistant (EDA), a portable multimedia player (PMP), a digital camera, a portable game console, a music player, a camcorder, a video player, a navigation device, a wearable device, an internet of things (IoT) device, an internet of everything (IoE) device, an e-book, a virtual reality (VR) device, an augmented reality (AR) device, a robotic device, etc., but example embodiments are not limited thereto.

For example, the electronic device 1000 may be connected with a battery 1920, and the battery 1920 may supply power that is used for an operation of the electronic device 1000. However, the present inventive concepts are not limited thereto. For example, power that is supplied to the electronic device 1000 may be provided from a power source different from the battery 1920.

The image processing block 1100 may receive light through a lens 1110. An image sensor 1120 and an image signal processor 1130 included in the image processing block 1100 may generate image information associated with an external object, based on the received light.

The communication block 1200 may exchange signals with an external device/system through an antenna 1210. A transceiver 1220 and a MODEM (Modulator/Demodulator) 1230 of the communication block 1200 may process signals, which are exchanged with the external device/system, depending on one or more of various wired/wireless communication protocols.

The audio processing block 1300 may process sound information by using an audio signal processor 1310. The audio processing block 1300 may receive audio input through a microphone 1320 or may output audio through a speaker 1330.

The buffer memory 1400 may store data that are used for an operation of the electronic device 1000. For example, the buffer memory 1400 may temporarily store data processed or to be processed by the main processor 1800. For example, the buffer memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 1500 may store data regardless of whether power is supplied. For example, the nonvolatile memory 1500 may include at least one of various nonvolatile memories such as a flash memory, a PRAM, an MRAM, a ReRAM, and a FRAM. For example, the nonvolatile memory 1500 may include a removable memory such as a secure digital (SD) card or a solid state drive (SSD), and/or an embedded memory such as an embedded multimedia card (eMMC).

The user interface 1600 may enable communication between the user and the electronic device 1000. For example, the user interface 1600 may include an input interface for receiving an input from the user and an output interface for providing information to the user.

The main processor 1800 may control the overall operation of the components of the electronic device 1000. The main processor 1800 may perform various operations for the purpose of operating the electronic device 1000. For example, the main processor 1800 may be implemented with an operation processing device/circuit, which may include one or more processor cores, such as a general-purpose processor, a special-purpose processor, an application processor, or a microprocessor, but example embodiments are not limited thereto.

The power management device 1900 and the charger circuit 1910 may supply power which is used for operating the electronic device 1000. For example, the power management device 1900 may be implemented with a plurality of power management integrated circuits (PMICs) 1900*a*, 1900*b*, . . . , 1900*n*. This will be described with reference to FIG. 2. Here, n may be a natural number greater than two.

Figure 2:
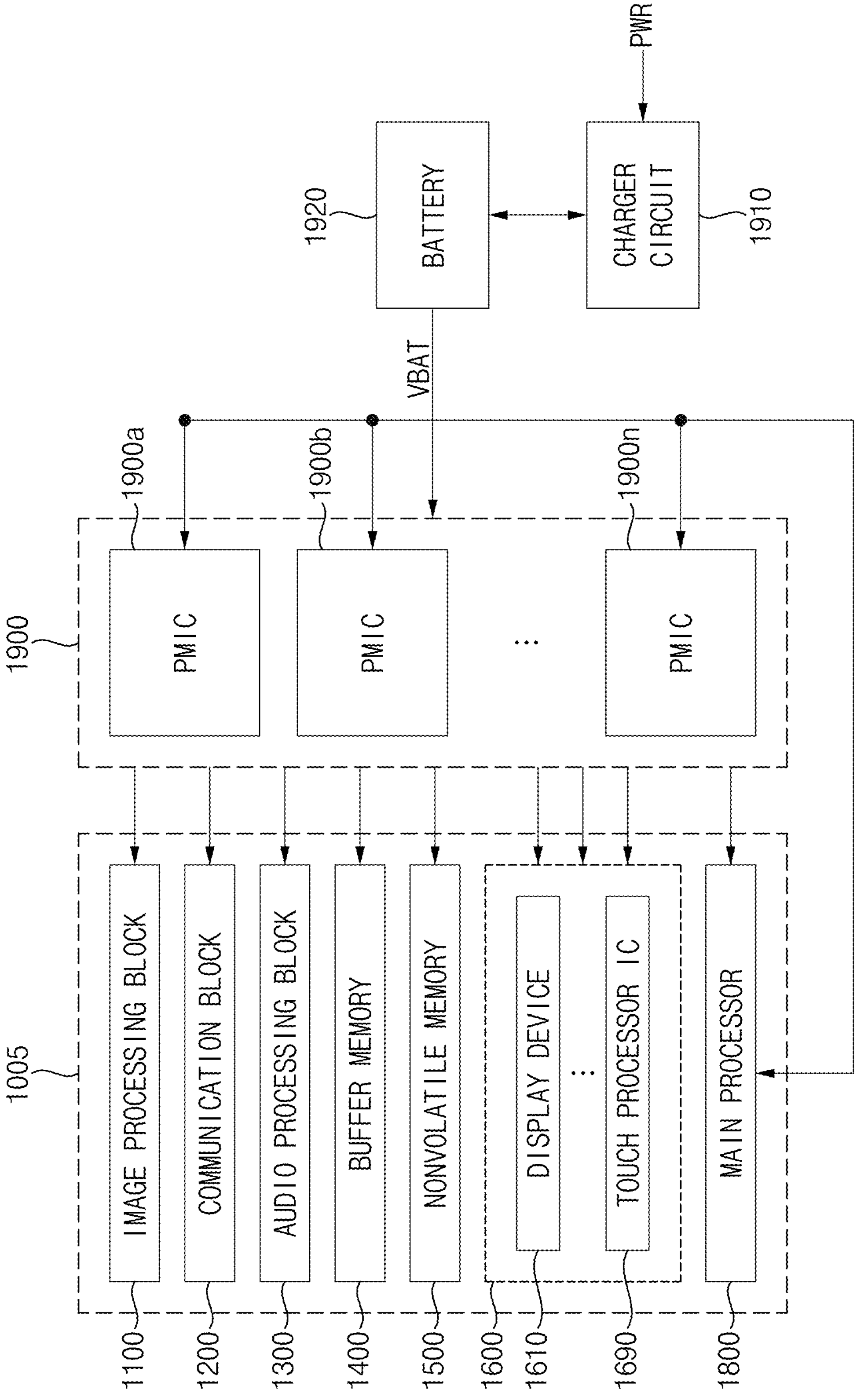
FIG. 2 illustrates a configuration associated with transmitting a power to components in the electronic device of FIG. 1 according to some example embodiments.

FIG. 2 illustrates a configuration associated with transmitting a power to components in the electronic device of FIG. 1 according to some example embodiments.

The power management device 1900 may supply power to components 1100 to 1800 of the electronic device 1000 through voltage rails (e.g., power rails). For example, the charger circuit 1910 may charge the battery 1920 based on power PWR received from outside and the battery 1920 may provide the power management device 1900 with a battery voltage VBAT based on the charged voltage. The power management device 1900 may output power to be supplied to components 1100 to 1600 and 1800 of the electronic device 1000, based on the battery voltage VBAT. The power management device 1900 may supply power, which is obtained by appropriately converting the battery voltage VBAT, to components 1100 to 1600 and 1800 of the electronic device 1000. The components 1100 to 1600, except the main processor 1800, may be referred to as a load system 1005.

In some example embodiments, the power management device 1900 may include a plurality of PMICs 1900*a*, 1900*b*, . . . , 1900*n*, each of which may supply power to at least one component of the electronic device 1000. For example, the voltage output from each PMIC may be transmitted to at least one of the image processing block 1100, the communication block 1200, the audio processing block 1300, the buffer memory 1400, the nonvolatile memory 1500, the user interface 1600 (e.g., input/output interfaces such as a display device 1610 and a touch processing integrated circuit (IC) 1690), and the main processor 1800, but example embodiments are not limited thereto. Each component of the electronic device 1000 may operate based on the transmitted voltage.

Voltages generated from the plurality of PMICs 1900*a*, 1900*b*, . . . , 1900*n* may be transmitted to the components 1100 to 1800 of the electronic device 1000 in a predetermined or preferred order or may be blocked in a predetermined or preferred order. To this end, the plurality of PMICs 1900*a*, 1900*b*, . . . , 1900*n* may be mutually synchronized during a power on sequence and a power off sequence.

In some example embodiments, before performing the power on sequence, a main PMIC, one of the PMICs 1900*a*, 1900*b*, . . . , 1900*n*, may enable first functions associated with a first initial operation based on the battery voltage VBAT during a stand-by period before generating first output voltages based on the battery voltage VBAT, and may apply a sub enable signal to the at least one sub PMIC (the at least one sub PMIC may correspond to PMICs 1900*a*, 1900*b*, . . . , 1900*n* except the main PMIC) through a first pin based on a power-on signal received from an outside after completing the first initial operation. Each of the sub PMICs may receive the first sub enable signal through a second pin and may enable second functions associated with a second initial operation based on the battery voltage, in response to an activation of the sub enable signal. Therefore, the power managing device 1900 may reduce stand-by current consumed during the stand-by period.

In some example embodiments, before performing the power on sequence, the main PMIC deactivates the sub enable signal in response to a deactivation of the power-on signal and applies the deactivated sub enable signal to the sub PMICs through a first pin. Each of the sub PMICs receives the deactivated sub enable signal through a second pin and disables the second functions. The main PMIC applies an activated sub enable signal to the sub PMICs, deactivates the first function after a predetermined or preferred time elapses from applying the activated sub enable signal to the sub PMICs and enters into an off state.

Figure 3:
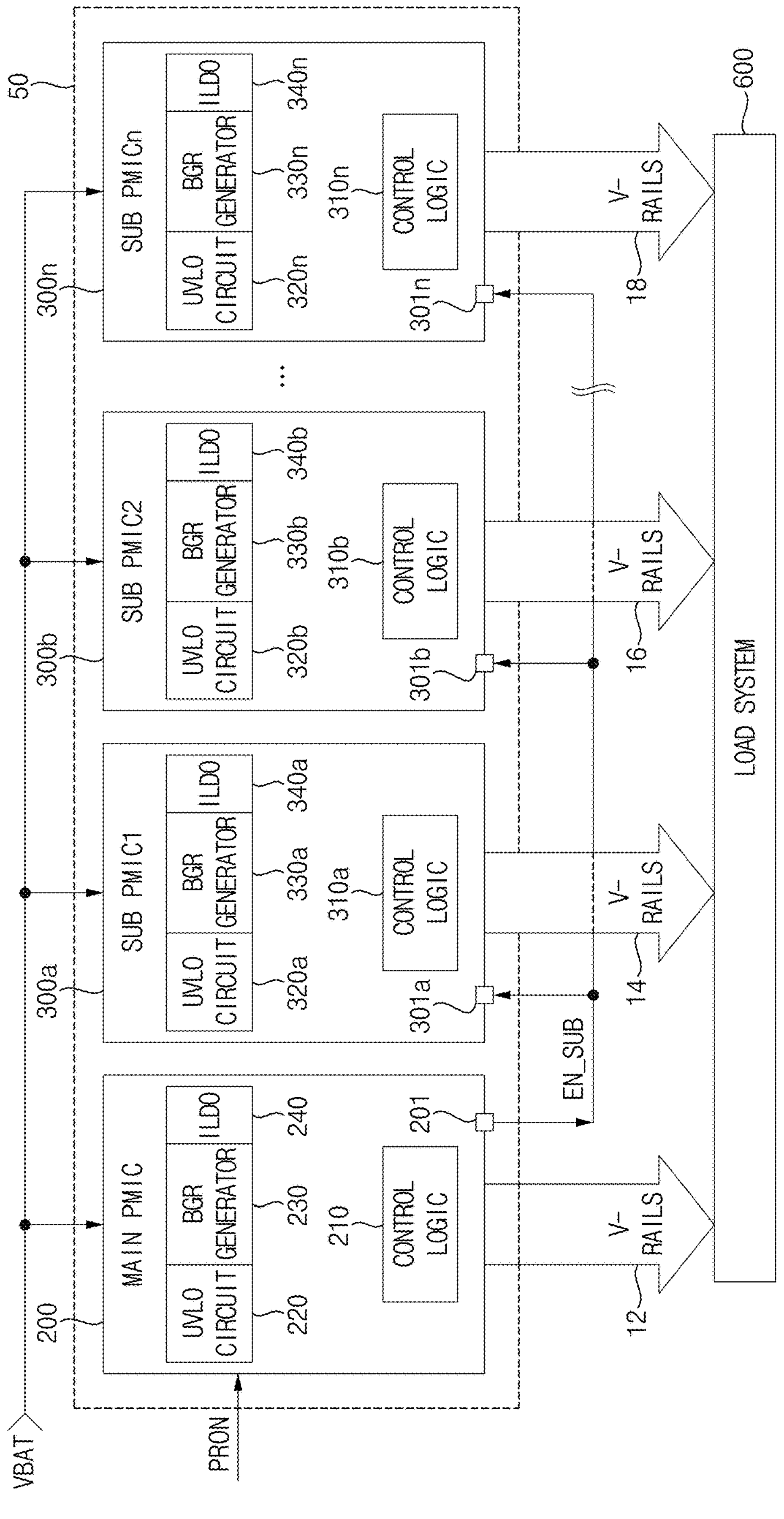
FIG. 3 is a block diagram illustrating an example of an electronic device according to some example embodiments.

FIG. 3 is a block diagram illustrating an example of an electronic device according to some example embodiments.

Referring to FIG. 3, an electronic device 10 may include a power management device 50 and a load system 600. The load system 600 may correspond to the load system 1005 illustrated in FIG. 2.

The power management device 50 may include a main PMIC 200 and a plurality of sub PMICs 300*a*, 300*b*, . . . , 300*n*. The plurality of sub PMICs 300*a*, 300*b*, . . . , 300*n* may be referred to as first through n-th sub PMICs.

The battery voltage VBAT may be commonly supplied to the main PMIC 200 and the plurality of sub PMICs 300*a*, 300*b*, . . . , 300*n* and the main PMIC 200 may receive a power-on signal PRON from an outside (e.g., the main processor 1800 in FIG. 2).

The main PMIC 200 may include a control logic 210, an under voltage lock-out (UVLO) circuit 220, a reference voltage (BGR) generator 230, an internal low drop-out (ILDO) regulator 240 and a first pin 201. The UVLO circuit 220, the BGR generator 230 and the ILDO regulator 240 may perform first functions associated with a first initial operation. The first pin 201 may be referred to as a first dedicated pin.

The sub PMIC 300*a* may include a control logic 310*a*, a UVLO circuit 320*a*, a BGR generator 330*a*, an ILDO regulator 340*a* and a second pin 301*a*. The UVLO circuit 320*a*, the BGR generator 330*a* and the ILDO regulator 340*a* may perform second functions associated with a second initial operation.

The sub PMIC 300*b* may include a control logic 310*b*, a UVLO circuit 320*b*, a BGR generator 330*b*, an ILDO regulator 340*b* and a second pin 301*b*. The UVLO circuit 320*b*, the BGR generator 330*b* and the ILDO regulator 340*b* may perform second functions associated with the second initial operation.

The sub PMIC 300*n* may include a control logic 310*n*, a UVLO circuit 320*n*, a BGR generator 330*n*, an ILDO regulator 340*n* and a second pin 301*n*. The UVLO circuit 320*n*, the BGR generator 330*n* and the ILDO regulator 340*n* may perform second functions associated with the second initial operation.

Each of the second pins 301*a*, 301*b*, . . . , 301*n* may be referred to a second dedicated pin.

Each of the main PMIC 200 and the plurality of sub PMICs 300*a*, 300*b*, . . . , 300*n* may provide a corresponding output voltage to the load system 600 through respective one of voltage rails V-RAILS 12, 14, 16, . . . , 18.

The main PMIC 200 may apply a sub enable signal EN_SUB to the plurality of sub PMICs 300*a*, 300*b*, . . . , 300*n* through the first pin 201. Each of the plurality of sub PMICs 300*a*, 300*b*, . . . , 300*n* may commonly receive the sub enable signal EN_SUB through . . . , respective one of the second pins 301*a*, 301*b*, . . . , 301*n* and may perform second functions associated with the second initial operation in response to an activation of the sub enable signal EN_SUB concurrently.

Figure 4:
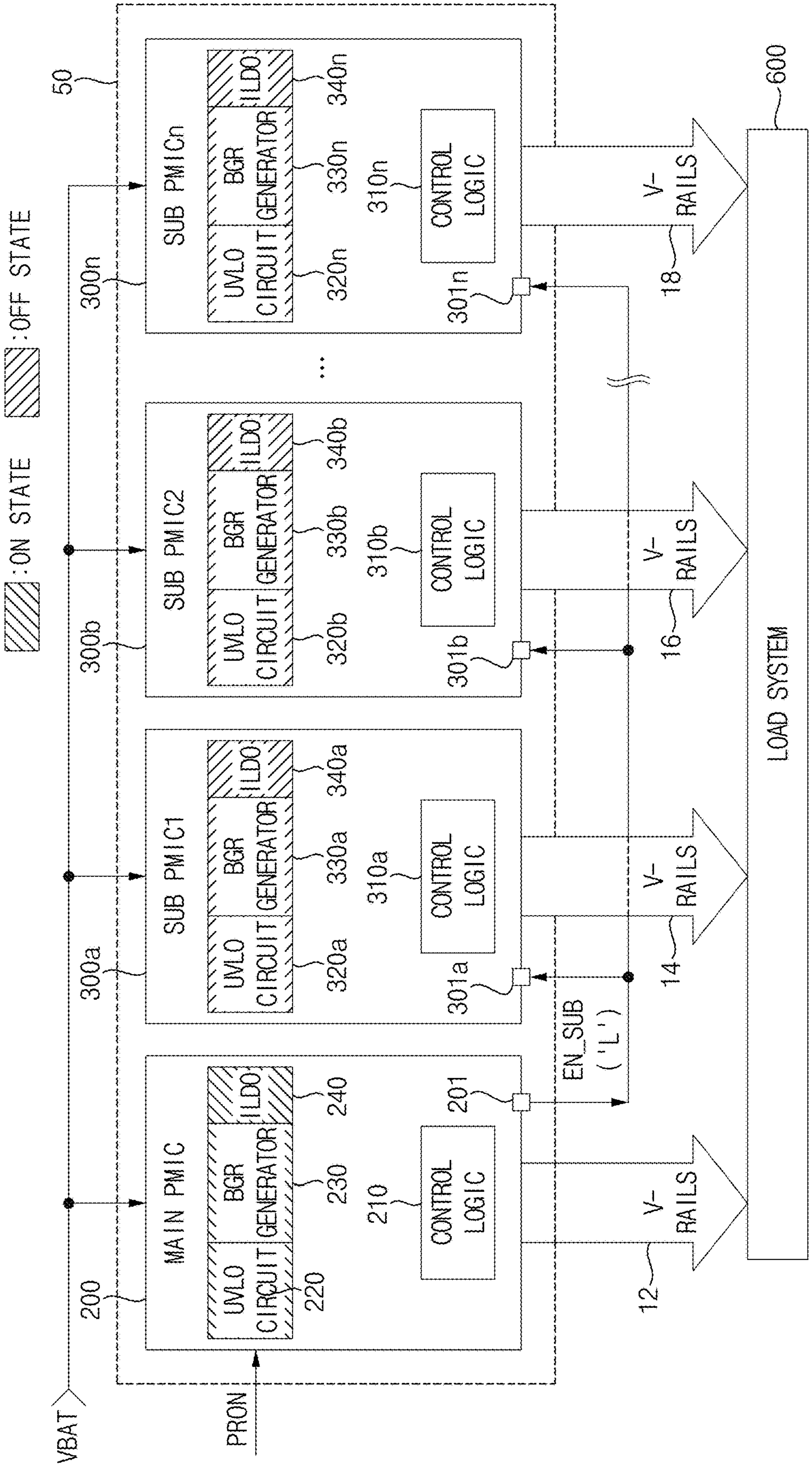
FIGS. 4 and 5 illustrate states of the main PMIC 200 the plurality of sub PMICs in the electronic device of FIG. 3, respectively, according to some example embodiments.
Figure 5:
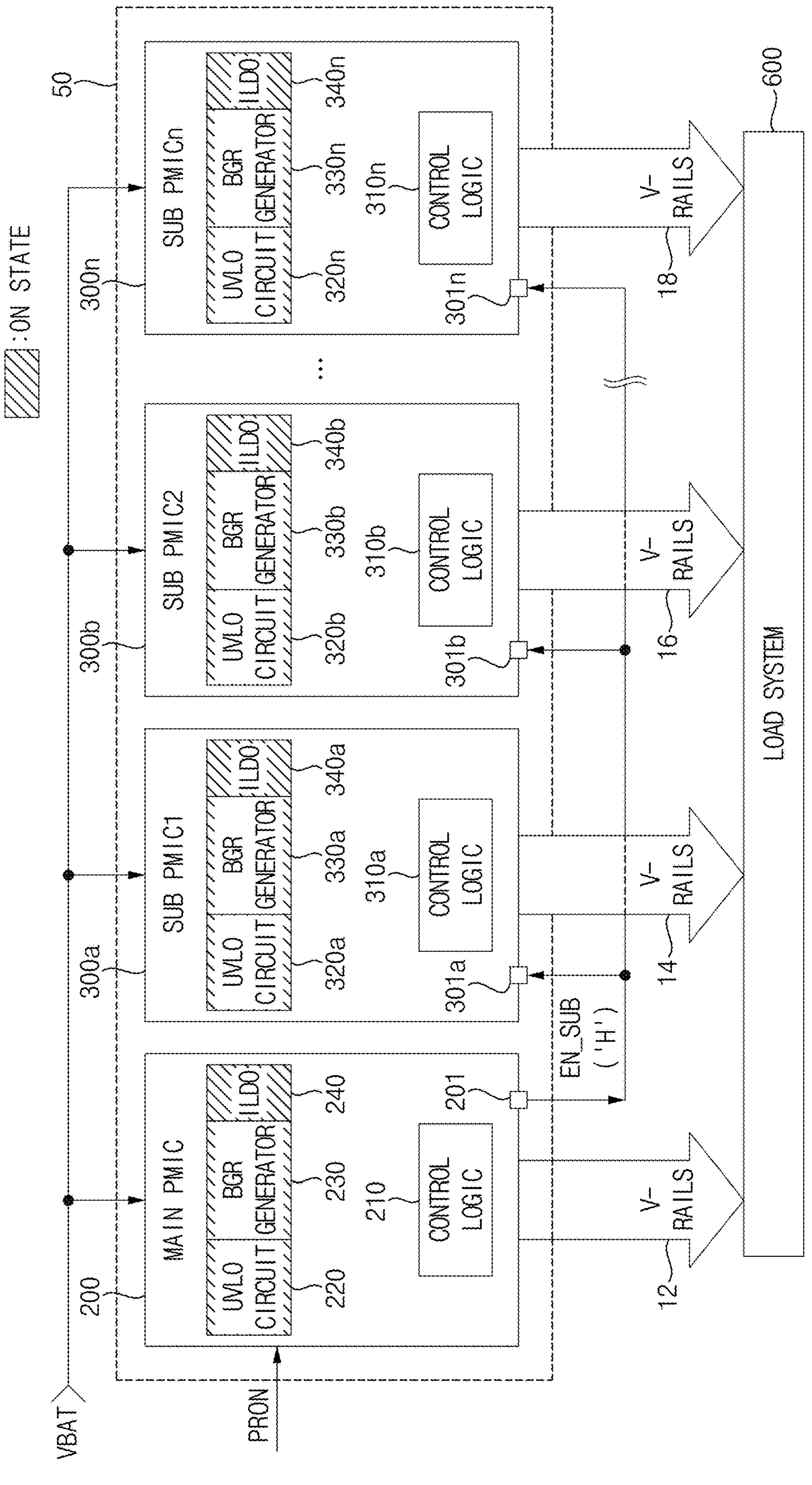

FIGS. 4 and 5 illustrate states of the main PMIC 200 the plurality of sub PMICs 300*a*, 300*b*, . . . , 300*n* in the electronic device of FIG. 3, respectively, according to some example embodiments.

Referring to FIG. 4, when the battery voltage VBAT is commonly supplied to the main PMIC 200 and the plurality of sub PMICs 300*a*, 300*b*, 300*n*, the UVLO circuit 220, the BGR generator 230 and the ILDO regulator 240 in the main PMIC 200, which perform the first functions associated with the first initial operation, are activated, enter into an on state and perform the first functions. According to some example embodiments, because the power-on signal PRON is in deactivated state, the control logic circuit 210 in the main PMIC 200 deactivates the sub enable signal EN_SUB with a logic low level (e.g., ‘L’), and applies the sub enable signal EN_SUB that is deactivated to the plurality of sub PMICs 300*a*, 300*b*, 300*n*. Because the sub enable signal EN_SUB has a logic low level, the UVLO circuits 320*a*, 320*b*, 320*n*, the BGR generators 330*a*, 330*b*, 330*n* and the ILDO regulators 340*a*, 340*b*, . . . , 340*n* in the plurality of sub PMICs 300*a*, 300*b*, . . . , 300*n* are in off state.

Referring to FIG. 5, the UVLO circuit 220, the BGR generator 230 and the ILDO regulator 240 in the main PMIC 200, which perform the first functions associated with the first initial operation, are in on state and perform the first functions. According to some example embodiments, because the power-on signal PRON is in activated state, the control logic circuit 210 in the main PMIC 200 activates the sub enable signal EN_SUB with a logic high level (e.g., ‘H’), and applies the sub enable signal EN_SUB that is activated to the plurality of sub PMICs 300*a*, 300*b*, 300*n*. Because the sub enable signal EN_SUB has a logic high level, the UVLO circuits 320*a*, 320*b*, . . . , 320*n*, the BGR generators 330*a*, 330*b*, . . . , 330*n* and the ILDO regulators 340*a*, 340*b*, 340*n* in the plurality of sub PMICs 300*a*, 300*b*, . . . , 300*n* transit to an on state and perform the second functions associated with the second initial operation concurrently.

Figure 6:
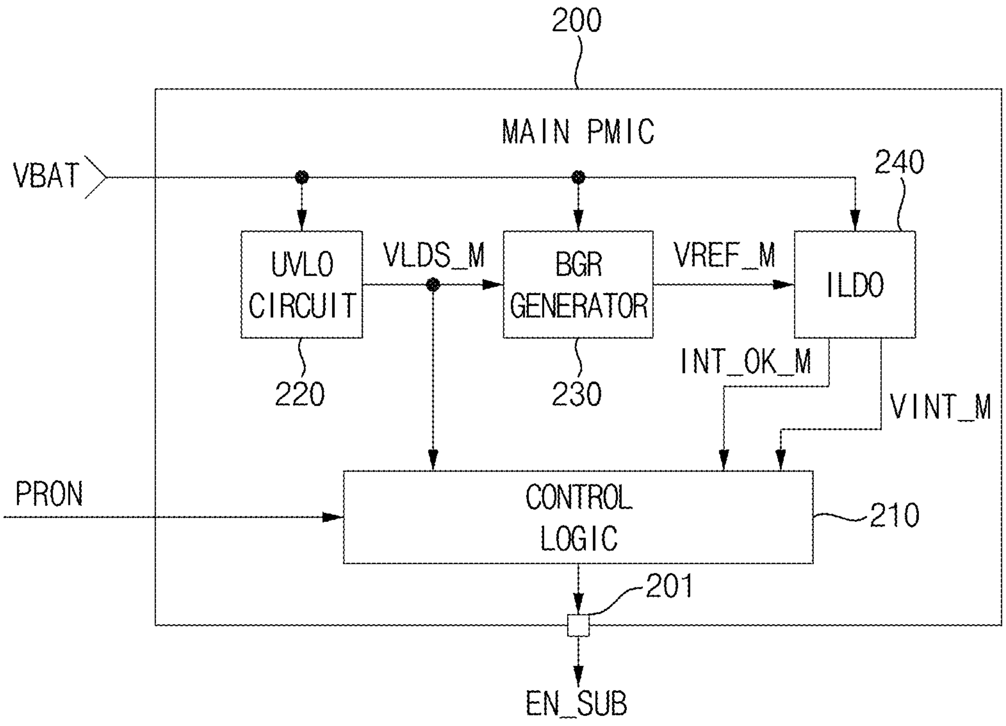
FIG. 6 is a block diagram illustrating examples of the main PMIC and the first sub PMIC in the electronic device of FIG. 3 according to some example embodiments.
Figure 6:
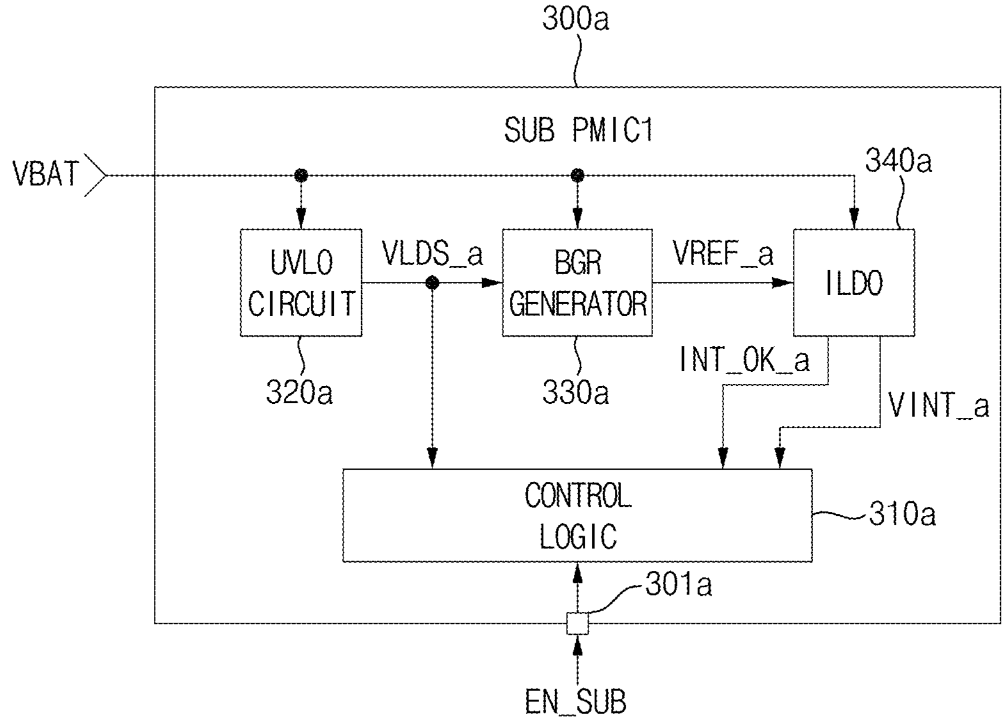

FIG. 6 is a block diagram illustrating examples of the main PMIC and the first sub PMIC in the electronic device of FIG. 3 according to some example embodiments.

Referring to FIG. 6, the main PMIC 200 may include the control logic 210, the UVLO circuit 220, the BGR generator 230, the ILDO regulator 240 and the first pin 201.

The UVLO circuit 220 may receive the battery voltage VBAT, may compare the battery voltage VBAT with a reference level, may generate a voltage level detection signal VLDS_M which is activated in response to the battery voltage VBAT reaching the reference level and may provide the voltage level detection signal VLDS_M to the BGR generator 230 and the control logic 210.

The BGR generator 230 may generate a reference voltage VREF_M based on the battery voltage VBAT, in response to an activation of the voltage level detection signal VLDS_M, and may provide the reference voltage VREF_M to the ILDO regulator 240.

The ILDO regulator 240 may receive the battery voltage VBAT and may generate an internal voltage VINT_M based on the reference voltage VREF_M and the battery voltage VBAT. The ILDO regulator 240 may generate the internal voltage VINT_M in response to the reference voltage VREF_M reaching a first target level, may provide the internal voltage VINT_M to the control logic 210 and may provide an okay signal INT_OK_M in response to the reference voltage VREF_M reaching a second target level.

The control logic 210 may receive the internal voltage VINT_M, may operate based on the internal voltage VINT_M, may receive the voltage level detection signal VLDS_M and the okay signal INT_OK_M, may activate the sub enable signal EN_SUB in response to the activation of the voltage level detection signal VLDS_M and the okay signal INT_OK_M and the activation of the power-on signal PRON and may apply the sub enable signal EN_SUB to the first sub PMIC 300*a* through the first pin 201.

The first sub PMIC 300*a* may include the control logic 310*a*, the UVLO circuit 320*a*, the BGR generator 330*a*, the ILDO regulator 340*a* and the second pin 301*a*.

The control logic 310*a* may receive the sub enable signal EN_SUB through the second pin 301*a* and may operate the UVLO circuit 320*a*, the BGR generator 330*a*, the ILDO regulator 340*a* and the second pin 301*a* in response to an activation of the sub enable signal EN_SUB.

The UVLO circuit 320*a* may receive the battery voltage VBAT, may compare the battery voltage VBAT with a reference level, may generate a voltage level detection signal VLDS_a which is activated in response to the battery voltage VBAT reaching the reference level and may provide the voltage level detection signal VLDS_a to the BGR generator 330*a* and the control logic 310*a*.

The BGR generator 330*a* may generate a reference voltage VREF_a based on the battery voltage VBAT, in response to an activation of the voltage level detection signal VLDS_a, and may provide the reference voltage VREF_a to the ILDO regulator 340*a*.

The ILDO regulator 340*a* may receive the battery voltage VBAT and may generate an internal voltage VINT_a based on the reference voltage VREF_a and the battery voltage VBAT. The ILDO regulator 340*a* may generate the internal voltage VINT_a in response to the reference voltage VREF_a reaching a first target level, may provide the internal voltage VINT_a to the control logic 310*a* and may provide an okay signal INT_OK_a in response to the reference voltage VREF_a reaching a second target level.

The control logic 310*a* may receive the internal voltage VINT_a, may operate based on the internal voltage VINT_a, may receive the voltage level detection signal VLDS_a and the okay signal INT_OK_a, and may perform a power-on sequence associated with generating a plurality of power supply voltages by controlling a plurality of DC-DC converters in response to the activation of the voltage level detection signal VLDS_a and the okay signal INT_OK_a.

Each configuration of the second through n-th PMICs 300*b*, . . . , 300*n* may be substantially the same as the configuration of the first sub PMIC 300*a* in FIG. 6.

Figure 7:
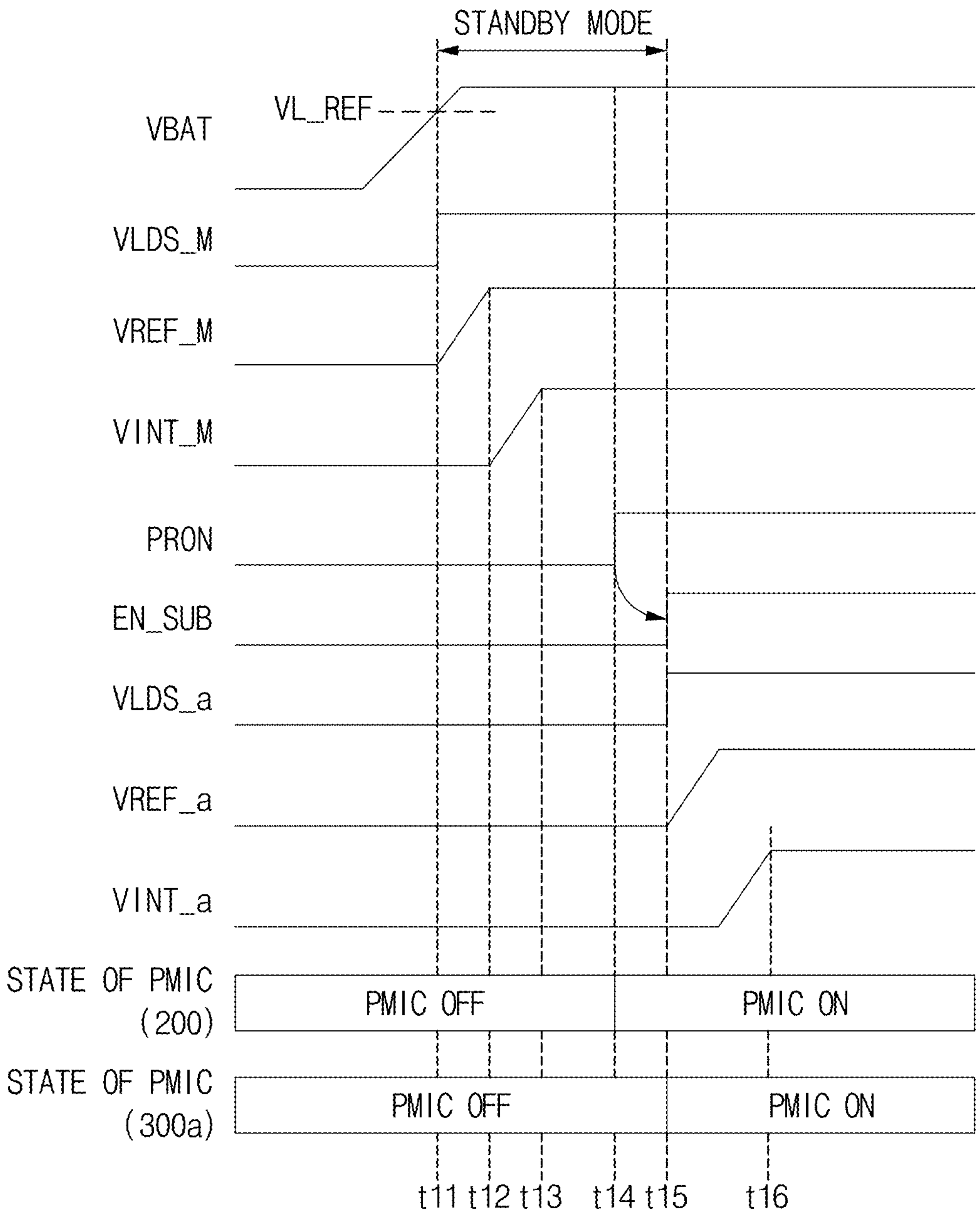
FIG. 7 is a timing diagram illustrating on scenario of the plurality of PMICs in the electronic device of FIG. 3 according to some example embodiments.

FIG. 7 is a timing diagram illustrating an "on" scenario of the plurality of PMICs in the electronic device of FIG. 3 according to some example embodiments.

Referring to FIGS. 3 through 7, when the battery voltage VBAT starts to be commonly supplied to the main PMIC 200 and the plurality of sub PMICs 300*a*, 300*b*, . . . , 300*n* in the electronic device 50, the UVLO circuit 220 may generate the voltage level detection signal VLDS_M which is activated in response to the battery voltage VBAT reaching a reference level VL_REF at a time point t11 and may provide the voltage level detection signal VLDS_M to the BGR generator 230 and the control logic 210.

At the time point t11, the BGR generator 230 generates the reference voltage VREF_M based on the battery voltage VBAT, in response to an activation of the voltage level detection signal VLDS_M and may provide the voltage level detection signal VLDS_M to the ILDO regulator 240.

The ILDO regulator 240 receives the battery voltage VBAT and may generate the internal voltage VINT_M in response to the reference voltage VREF_M reaching a first target level at a time point t12, and may provide the internal voltage VINT_M to the control logic 210. The internal voltage VINT_M may reach a second target level at a second time point t13.

In response to activation of the power-on signal PRON at a time point t14, the control logic 210 activates the sub enable signal EN_SUB at a time point t15 and may provide the sub enable signal EN_SUB that is activated to the first sub PMIC 300*a* and plurality of sub PMICs 300*b*, . . . , 300*n*.

The first sub PMIC 300*a* receives the sub enable signal EN_SUB that is activated through the second pin 301*a*, the UVLO circuit 320*a* generates the voltage level detection signal VLDS_a which is activated at the time point t15 and may provide the voltage level detection signal VLDS_a to the BGR generator 330*a* and the control logic 310*a*.

At the time point t15, the BGR generator 330*a* generates the reference voltage VREF_a based on the battery voltage VBAT, in response to an activation of the voltage level detection signal VLDS_a and may provide the voltage level detection signal VLDS_a to the ILDO regulator 340*a*.

The ILDO regulator 340*a* receives the battery voltage VBAT and may generate the internal voltage VINT_a in response to the reference voltage VREF_a reaching a first target level, and may provide the internal voltage VINT_a to the control logic 310*a*. The internal voltage VINT_a may reach a second target level at a time point t16.

The main PMIC 200 is in an off state until the time point t14 and transits to an on state from the time point t14. The first sub PMIC 300*a* and plurality of sub PMICs 300*b*, . . . , 300*n* are in off state until the time point t15 and transit to on state from the time point t15.

Therefore, in some example embodiments, a stand-by mode (e.g., a stand-by state) of the main PMIC 200 and the plurality of sub PMICs 300*a*, 300*b*, . . . , 300*n* of the electronic device 50 corresponds to a time interval from the time point t11 to the time point t15.

Figure 8:
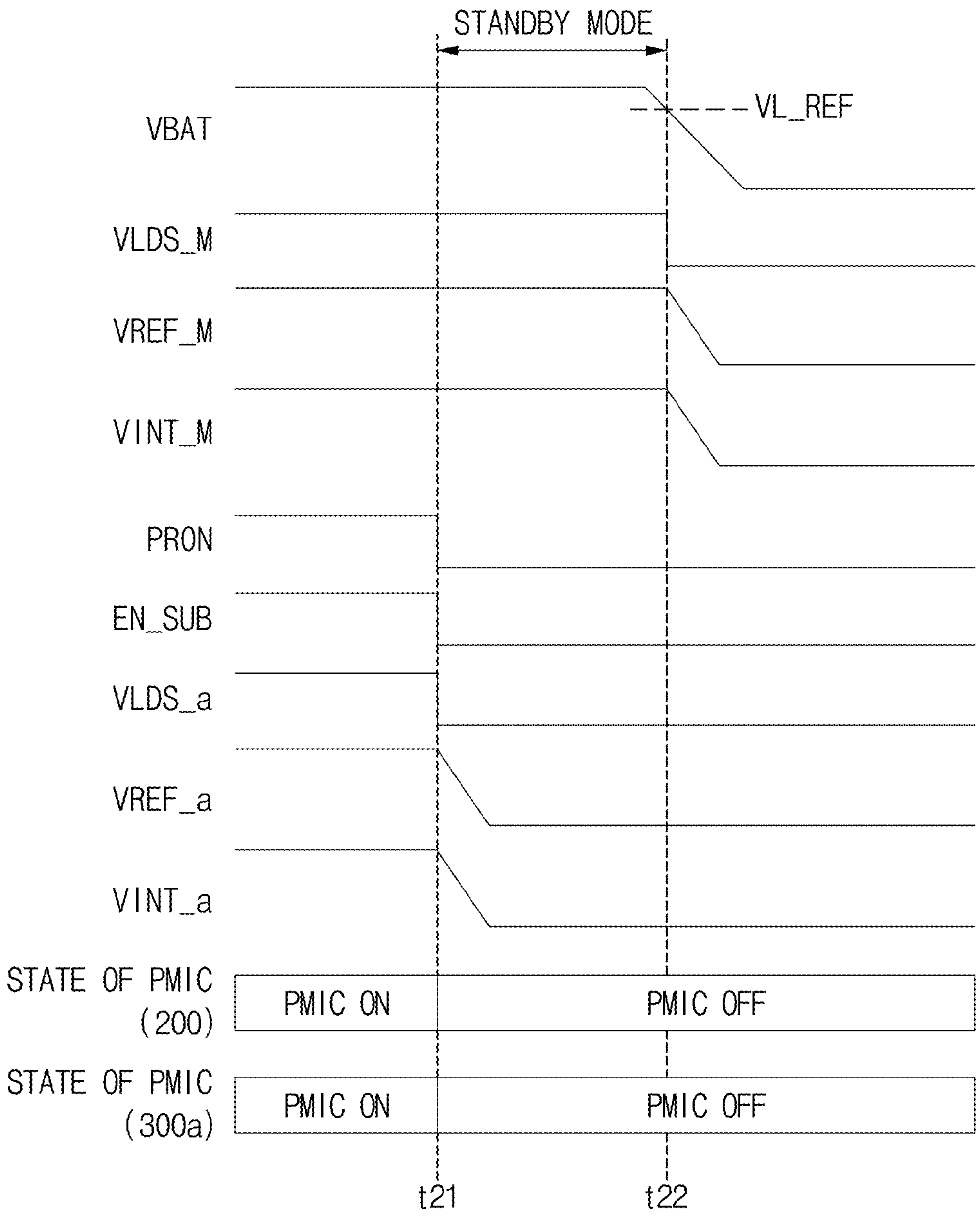
FIG. 8 is a timing diagram illustrating off scenario of the plurality of PMICs in the electronic device of FIG. 3 according to some example embodiments.

FIG. 8 is a timing diagram illustrating an "off" scenario of the plurality of PMICs in the electronic device of FIG. 3 according to some example embodiments.

Referring to FIGS. 3 through 6 and 8, the control logic 210 in the main PMIC 200 deactivates the sub enable signal EN_SUB with a logic low level in response to a deactivation of the power-on signal PRON at a time point t21. The UVLO circuit 320*a*, the BGR generator 330*a* and the ILDO regulator 340*a* in the first sub PMIC 300*a* are deactivated at the first time point t21, the voltage level detection signal VLDS_a is deactivated with a logic low level and voltage levels of the reference voltage VREF_a and the internal voltage VINT_a decrease.

In some example embodiments, when the battery voltage VBAT becomes equal to or smaller than the reference level VL_REF at a time point t22, the UVLO circuit 220 deactivates the voltage level detection signal VLDS_M with a logic low level, the BGR generator 230 halts generating the reference voltage VREF_M in response to the deactivated voltage level detection signal VLDS_M and the ILDO regulator 240 halts generating the internal voltage VINT_M at the time point t22.

The main PMIC 200, the first sub PMIC 300*a* and plurality of sub PMICs 300*b*, . . . , 300*n* are in an "on" state until the time point t21 and transit to an "off" state from the time point t21.

Therefore, in some example embodiments, a stand-by mode (e.g., a stand-by state) before a power-off sequence of the main PMIC 200 and the plurality of sub PMICs 300*a*, 300*b*, . . . , 300*n* of the electronic device 50 corresponds to a time interval from the time point t21 to the time point t22.

Figure 9:
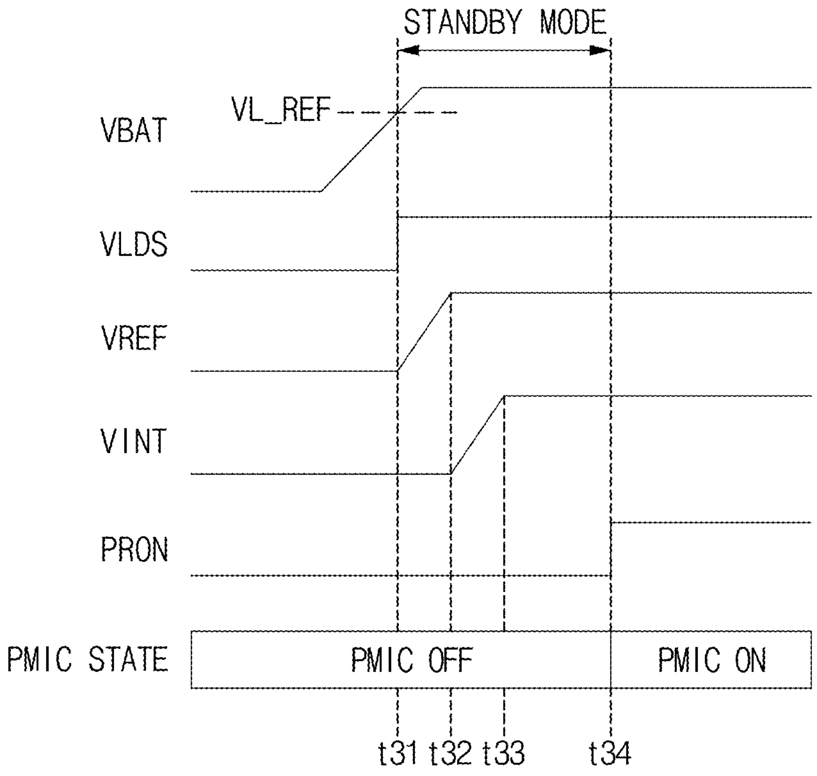
FIG. 9 is a timing diagram illustrating on scenario of a plurality of PMICs when the plurality of PMICs do not use a sub enable signal according to some example embodiments.

FIG. 9 is a timing diagram illustrating an "on" scenario of a plurality of PMICs when the plurality of PMICs do not use a sub enable signal according to some example embodiments.

In FIG. 9, for example each of the plurality of PMICs includes a control logic, a UVLO circuit, a BGR generator and an ILDO regulator.

Referring to FIG. 9, in some example embodiments, when the battery voltage VBAT starts to be commonly supplied to the plurality of PMICs, the UVLO circuit generates a voltage level detection signal VLDS which is activated in response to the battery voltage VBAT reaching a reference level VL_REF at a time point t31 and provides the voltage level detection signal VLDS to the BGR generator.

At the time point t31, the BGR generator generates a reference voltage VREF based on the battery voltage VBAT, in response to an activation of the voltage level detection signal VLDS and provides the voltage level detection signal VLDS to the ILDO regulator.

The ILDO regulator receives the battery voltage VBAT and generates an internal voltage VINT in response to the reference voltage VREF reaching a first target level at a time point t32, and may provide the internal voltage VINT to the control logic. The internal voltage VINT may reach a second target level at a second time point t33.

In response to activation of the power-on signal PRON at a time point t34, the plurality of PMICs transit from an “off” state to an “on” state.

Therefore, in some example embodiments, a stand-by mode (e.g., a stand-by state) of the plurality of sub PMICs in FIG. 9 corresponds to a time interval from the time point t31 to the time point t34.

When compared with FIG. 7, stand-by current consumed during the stand-by mode increases because the control logic, the UVLO circuit, the BGR generator and the ILDO regulator in all of the plurality of PMICs operate during the stand-by mode in FIG. 9.

Figure 10:
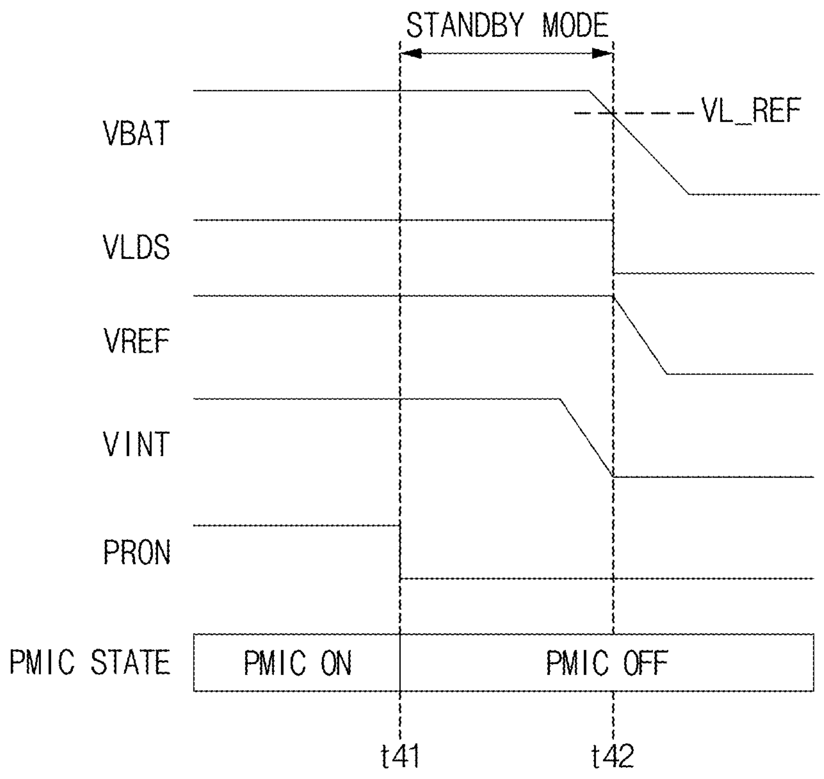
FIG. 10 is a timing diagram illustrating off scenario of a plurality of PMICs when the plurality of PMICs do not use a sub enable signal according to some example embodiments.

FIG. 10 is a timing diagram illustrating an “off” scenario of a plurality of PMICs when the plurality of PMICs do not use a sub enable signal.

Referring to FIG. 10, when the power-on signal PRON is deactivated with a logic low level in each of the plurality of PMICs at a time point t41, and when the battery voltage VBAT becomes equal to or smaller than the reference level VL_REF at a time point t42, the UVLO circuit deactivates the voltage level detection signal VLDS with a logic low level, the BGR generator halts generating the reference voltage VREF in response to the deactivated voltage level detection signal VLDS and the ILDO regulator halts generating the internal voltage VINT at the time point t42.

The plurality of PMICs are in an “on” state until the time point t41 and transit to an “off” state from the time point t41.

Therefore, in some example embodiments, a stand-by mode (e.g., a stand-by state) before a power-off sequence of the plurality of PMICs in FIG. 10 corresponds to a time interval from the time point t41 to the time point t42.

When compared with FIG. 8, stand-by current consumed during the stand-by mode increases because the control logic, the UVLO circuit, the BGR generator and the ILDO regulator in all of the plurality of PMICs operate during the stand-by mode in FIG. 10.

Figure 11:
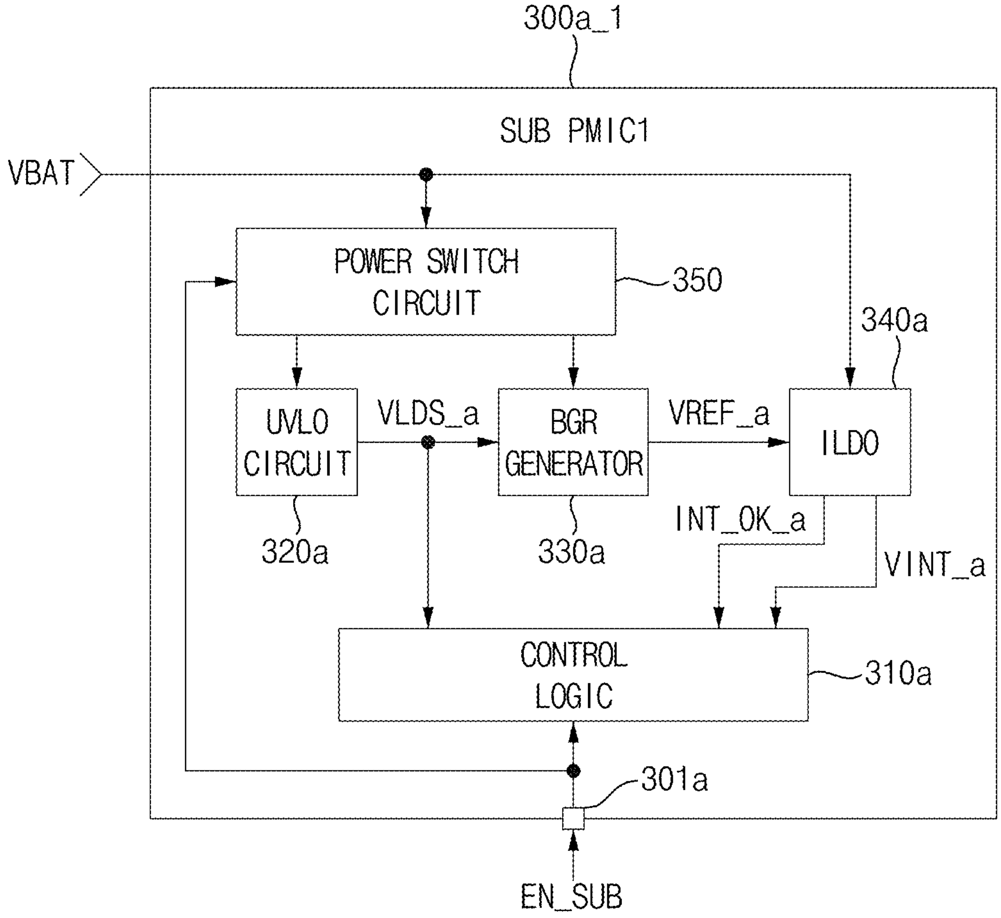
FIG. 11 is a block diagram illustrating an example of the first sub PMIC in the electronic device of FIG. 3 according to some example embodiments.

FIG. 11 is a block diagram illustrating an example of the first sub PMIC in the electronic device of FIG. 3 according to some example embodiments.

Referring to FIG. 11, a first sub PMIC 300*a*_1 may include the control logic 310*a*, the UVLO circuit 320*a*, the BGR generator 330*a*, the ILDO regulator 340*a*, a power switch circuit 350 and the second pin 301*a*.

The power switch circuit 350 may selectively transfer the battery voltage VBAT to the UVLO circuit 320*a* and the BGR generator 330*a* based on the sub enable signal EN_SUB received through the second pin 301*a*. The power switch circuit 350 may provide the battery voltage VBAT to the UVLO circuit 320*a* and the BGR generator 330*a* in response to an activation of the sub enable signal EN_SUB.

The control logic 310*a* may receive the sub enable signal EN_SUB through the second pin 301*a* and may operate the UVLO circuit 320*a*, the BGR generator 330*a*, the ILDO regulator 340*a* and the second pin 301*a* in response to an activation of the sub enable signal EN_SUB.

The UVLO circuit 320*a* may receive the battery voltage VBAT through the power switch circuit 350, may compare the battery voltage VBAT with a reference level, may generate a voltage level detection signal VLDS_a which is activated in response to the battery voltage VBAT reaching the reference level and may provide the voltage level detection signal VLDS_a to the BGR generator 330*a* and the control logic 310*a*.

The BGR generator 330*a* may receive the battery voltage VBAT through the power switch circuit 350, may generate a reference voltage VREF_a based on the battery voltage VBAT, in response to an activation of the voltage level detection signal VLDS_a and may provide the voltage level detection signal VLDS_a to the ILDO regulator 340*a*.

The ILDO regulator 340*a* may receive the battery voltage VBAT and may generate an internal voltage VINT_a based on the reference voltage VREF_a and the battery voltage VBAT. The ILDO regulator 340*a* may generate the internal voltage VINT_a in response to the reference voltage VREF_a reaching a first target level, may provide the internal voltage VINT_a to the control logic 310*a* and may provide an okay signal INT_OK_a in response to the reference voltage VREF_a reaching a second target level.

The control logic 310*a* may receive the internal voltage VINT_a, may operate based on the internal voltage VINT_a, may receive the voltage level detection signal VLDS_a and the okay signal INT_OK_a, and may perform a power-on sequence associated with generating a plurality of power supply voltages by controlling a plurality of DC-DC converters in response to the activation of the voltage level detection signal VLDS_a and the okay signal INT_OK_a.

According to some example embodiments, each configuration of the second through n-th PMICs 300*b*, . . . , 300*n* may be substantially the same as the configuration of the first sub PMIC 300*a*_1 in FIG. 11.

Figure 12A:
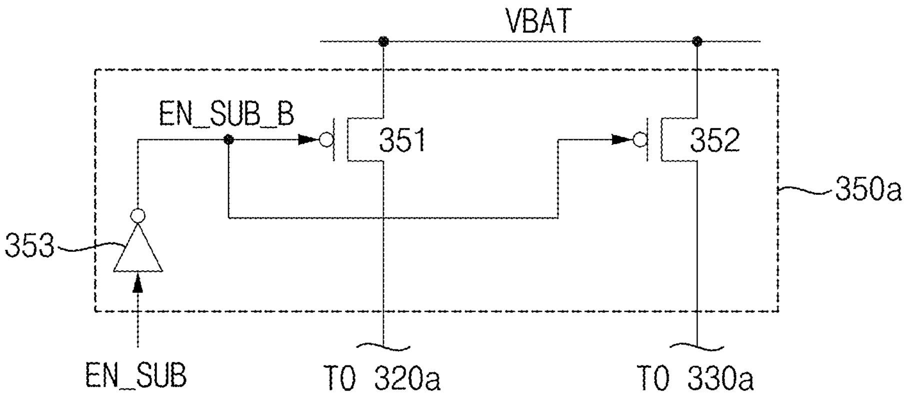
FIG. 12A is a circuit diagram illustrating an example of the power switch circuit in FIG. 11 according to some example embodiments.

FIG. 12A is a circuit diagram illustrating an example of the power switch circuit in FIG. 11 according to some example embodiments.

Referring to FIG. 12A, a power switch circuit 350*a* may include a first p-channel metal-oxide semiconductor (PMOS) transistor 351, a second PMOS transistor 352 and an inverter 353.

The inverter 353 may generate an inverted sub enable signal EN_SUB_B by inverting the sub enable signal EN_SUB.

The first PMOS transistor 351 may have a source receiving the battery voltage VBAT, a drain connected to the UVLO circuit 320*a* and a gate receiving the inverted sub enable signal EN_SUB_B, and may selectively transfer the battery voltage VBAT to the UVLO circuit 320*a* based on the inverted sub enable signal EN_SUB_B.

The second PMOS transistor 352 may have a source receiving the battery voltage VBAT, a drain connected to the BGR generator 330*a* and a gate receiving the inverted sub enable signal EN_SUB_B, and may selectively transfer the battery voltage VBAT to the BGR generator 330*a* based on the inverted sub enable signal EN_SUB_B.

Figure 12B:
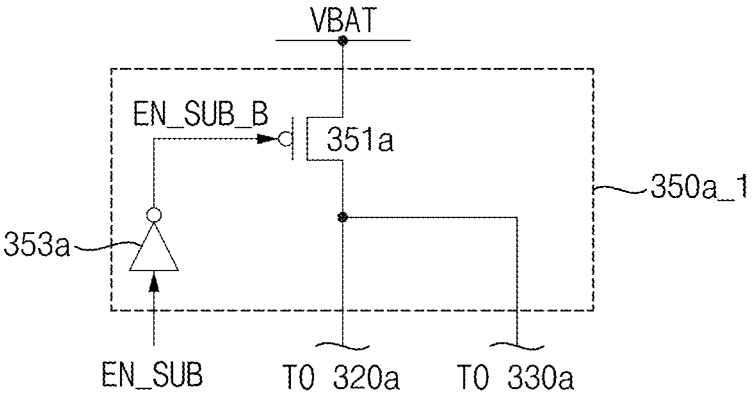
FIG. 12B is a circuit diagram illustrating an example of the power switch circuit in FIG. 11 according to some example embodiments.

FIG. 12B is a circuit diagram illustrating an example of the power switch circuit in FIG. 11 according to some example embodiments.

Referring to FIG. 12B, a power switch circuit 350*a*_1 may include a PMOS transistor 351*a* and an inverter 353*a*.

The inverter 353*a* may generate an inverted sub enable signal EN_SUB_B by inverting the sub enable signal EN_SUB.

The PMOS transistor 351*a* may have a source receiving the battery voltage VBAT, a drain connected to the UVLO circuit 320*a* and the BGR generator 330*a* and a gate receiving the inverted sub enable signal EN_SUB_B, and may selectively transfer the battery voltage VBAT to the UVLO circuit 320*a* and the BGR generator 330*a* based on the inverted sub enable signal EN_SUB_B.

Figure 13A:
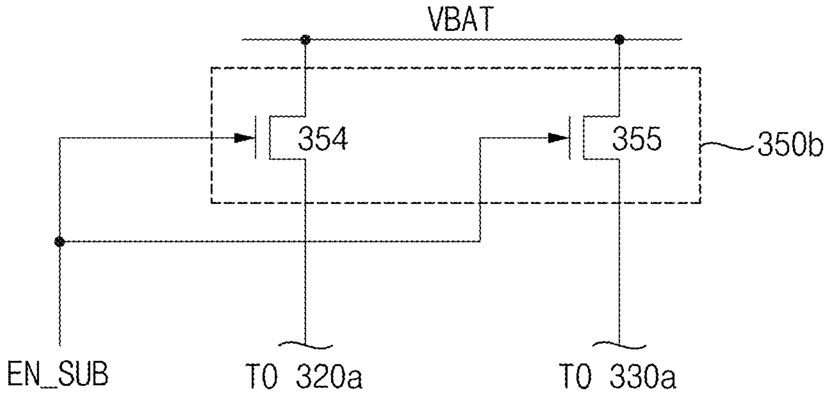
FIG. 13A is a circuit diagram illustrating an example of the power switch circuit in FIG. 11 according to some example embodiments.

FIG. 13A is a circuit diagram illustrating an example of the power switch circuit in FIG. 11 according to some example embodiments.

Referring to FIG. 13A, a power switch circuit 350*b* may include a first n-channel metal-oxide semiconductor (NMOS) transistor 354 and a second NMOS transistor 355.

The first NMOS transistor 354 may have a drain receiving the battery voltage VBAT, a source connected to the UVLO circuit 320*a* and a gate receiving the sub enable signal EN_SUB, and may selectively transfer the battery voltage VBAT to the UVLO circuit 320*a* based on the sub enable signal EN_SUB.

The second NMOS transistor 355 may have a drain receiving the battery voltage VBAT, a source connected to the BGR generator 330*a* and a gate receiving the sub enable signal EN_SUB, and may selectively transfer the battery voltage VBAT to the BGR generator 330*a* based on the sub enable signal EN_SUB_B.

Figure 13B:
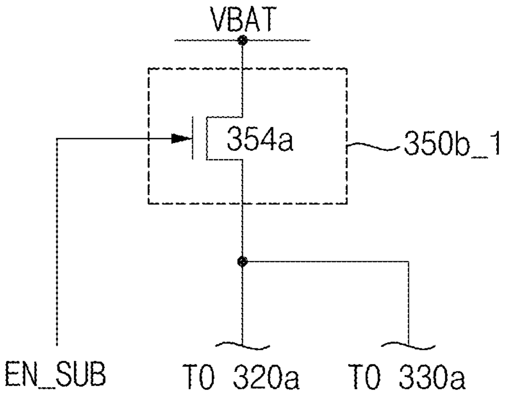
FIG. 13B is a circuit diagram illustrating an example of the power switch circuit in FIG. 11 according to some example embodiments.

FIG. 13B is a circuit diagram illustrating an example of the power switch circuit in FIG. 11 according to some example embodiments.

Referring to FIG. 13B, a power switch circuit 350*b*_1 may include an NMOS transistor 354*a*.

The NMOS transistor 354*a* may have a drain receiving the battery voltage VBAT, a source connected to the UVLO circuit 320*a* and the BGR generator 330*a* and a gate receiving the sub enable signal EN_SUB, and may selectively transfer the battery voltage VBAT to the UVLO circuit 320*a* and the BGR generator 330*a* based on the sub enable signal EN_SUB.

Figure 14A:
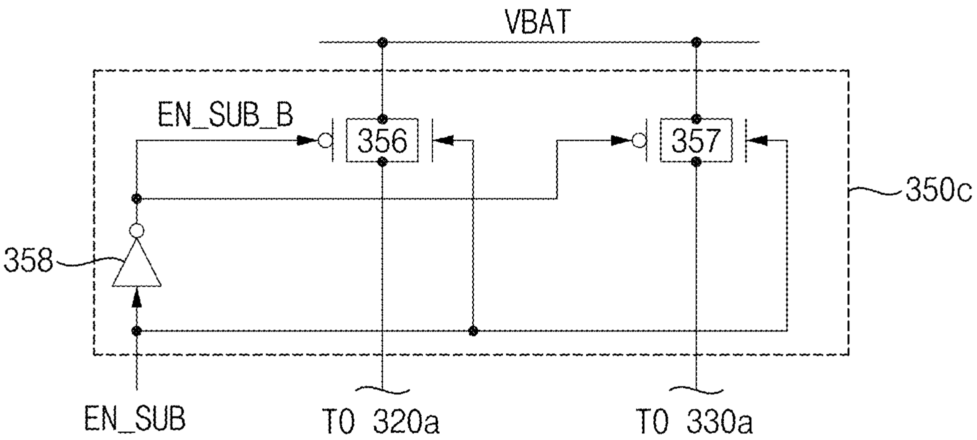
FIG. 14A is a circuit diagram illustrating an example of the power switch circuit in FIG. 11 according to some example embodiments.

FIG. 14A is a circuit diagram illustrating an example of the power switch circuit in FIG. 11 according to some example embodiments.

Referring to FIG. 14A, a power switch circuit 350*c* may include a first transmission gate 356, a second transmission gate 357 and an inverter 358.

The inverter 358 may generate an inverted sub enable signal EN_SUB_B by inverting the sub enable signal EN_SUB.

The first transmission gate 356 may have a first terminal receiving the battery voltage VBAT, a second terminal connected to the UVLO circuit 320*a* and a control terminal receiving the sub enable signal EN_SUB and the inverted sub enable signal EN_SUB_B, and may selectively transfer the battery voltage VBAT to the UVLO circuit 320*a* based on the sub enable signal EN_SUB and the inverted sub enable signal EN_SUB_B.

The second transmission gate 357 may have a first terminal receiving the battery voltage VBAT, a second terminal connected to the BGR generator 330*a* and a control terminal receiving the sub enable signal EN_SUB and the inverted sub enable signal EN_SUB_B, and may selectively transfer the battery voltage VBAT to the BGR generator 330*a* based on the sub enable signal EN_SUB and the inverted sub enable signal EN_SUB_B.

Figure 14B:
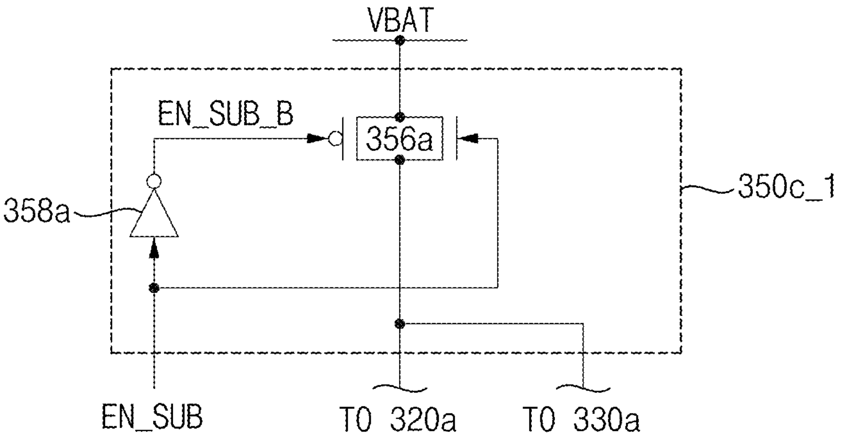
FIG. 14B is a circuit diagram illustrating an example of the power switch circuit in FIG. 11 according to some example embodiments.

FIG. 14B is a circuit diagram illustrating an example of the power switch circuit in FIG. 11 according to some example embodiments.

Referring to FIG. 14B, a power switch circuit 350*c*_1 may include a transmission gate 356*a* and an inverter 358*a*.

The inverter 358*a* may generate an inverted sub enable signal EN_SUB_B by inverting the sub enable signal EN_SUB.

The transmission gate 356*a* may have a first terminal receiving the battery voltage VBAT, a second terminal connected to the UVLO circuit 320*a* and the BGR generator 330*a* and a control terminal receiving the sub enable signal EN_SUB and the inverted sub enable signal EN_SUB_B, and may selectively transfer the battery voltage VBAT to the UVLO circuit 320*a* and the BGR generator 330*a* based on the sub enable signal EN_SUB and the inverted sub enable signal EN_SUB_B.

Therefore, in some example embodiments, the power switch circuit 350 in FIG. 11 may include one of a pair including the first PMOS transistor 351 and the second PMOS transistor 352, a pair including the first NMOS transistor 354 and the second NMOS transistor 355 and a pair including the first transmission gate 356 and the second transmission gate 357.

Alternatively, in some example embodiments, the power switch circuit 350 in FIG. 11 may include one of the PMOS transistor 351*a*, the NMOS transistor 354*a* and the transmission gate 356*a*.

Figure 15:
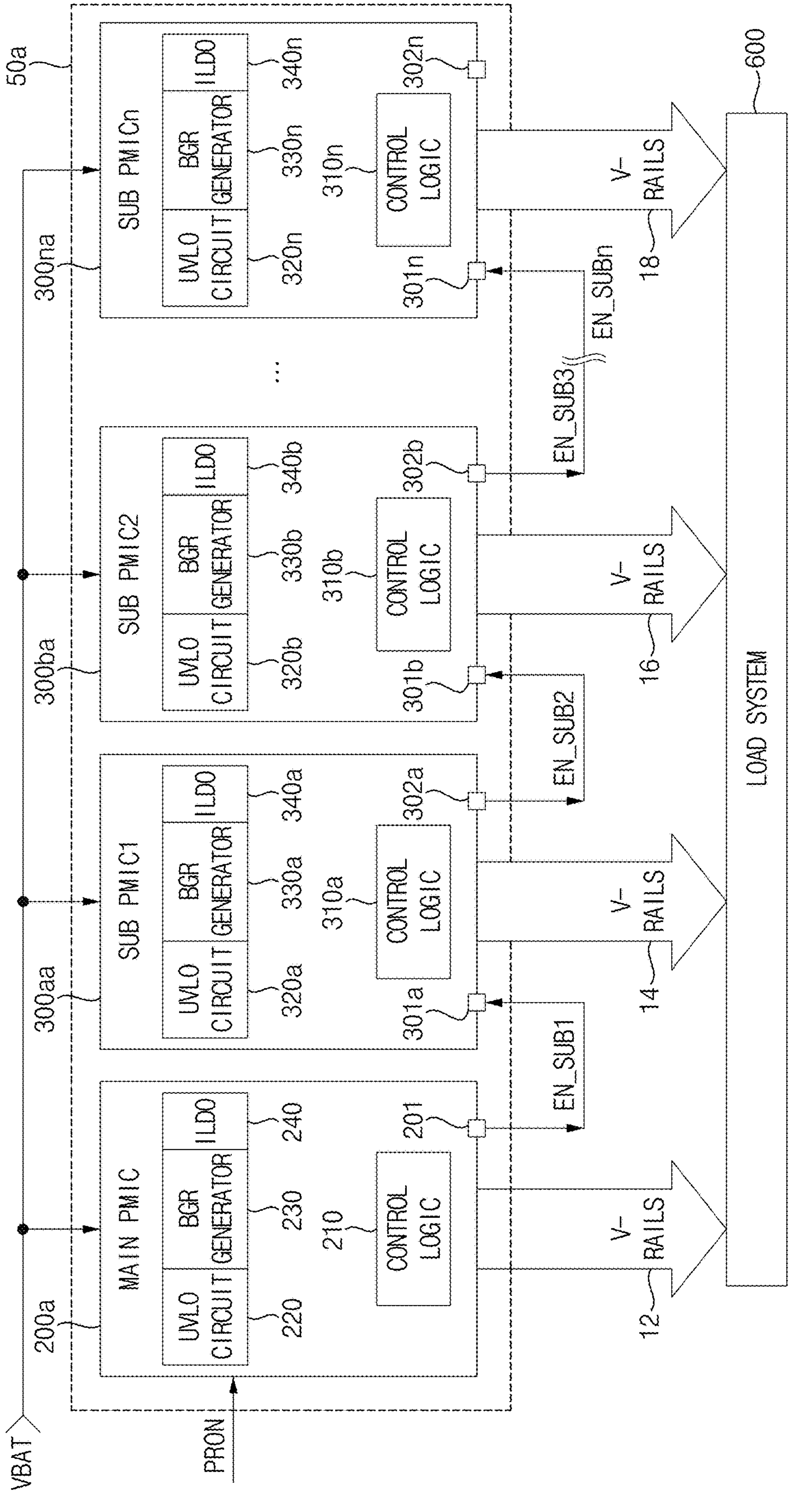
FIG. 15 is a block diagram illustrating an example of an electronic device according to example embodiments.

FIG. 15 is a block diagram illustrating an example of an electronic device according to some example embodiments.

Referring to FIG. 15, an electronic device 10*a* may include a power management device 50*a* and a load system 600. According to some example embodiments, the load system 600 may correspond to the load system 1005 in FIG. 2.

The power management device 50*a* may include a main PMIC 200*a* and a plurality of sub PMICs 300*aa*, 300*ba*, . . . , 300*na*. The plurality of sub PMICs 300*aa*, 300*ba*, . . . , 300*na* may be referred to as first through n-th sub PMICs.

The battery voltage VBAT may be commonly supplied to the main PMIC 200*a* and the plurality of sub PMICs 300*aa*, 300*ba*, . . . , 300*na* and the main PMIC 200*a* may receive a power-on signal PRON from an outside (e.g., the main processor 1800 in FIG. 2).

According to some example embodiments, each configuration of the main PMIC 200*a* and the plurality of sub PMICs 300*aa*, 300*ba*, . . . , 300*na* may be substantially similar with each configuration of main PMIC 200 and the plurality of sub PMICs 300*a*, 300*b*, . . . , 300*n* in FIG. 3.

Each of the plurality of sub PMICs 300*aa*, 300*ba*, . . . , 300*na* may include respective one of second pins 301*a*, 301*b*, . . . , 301*n* and respective one of third pins 302*a*, 302*b*, 302*n*.

The main PMIC 200*a* performs first functions associated with a first initial operation and may apply a first sub enable signal EN_SUB1 to the first sub PMIC 300*aa* from among plurality of sub PMICs 300*aa*, 300*ba*, . . . , 300*na* through the first pin 201 in response to an activation of the power-on signal PRON.

The first sub PMIC 300*aa* may receive the first sub enable signal EN_SUB1 that is activated through the second pin 301*a*, may activate a second sub enable signal EN_SUB2 in response to activation of the first sub enable signal EN_SUB1, and may provide the second sub enable signal EN_SUB2 that is activated to the second sub PMIC 300*ba* through the third pin 302*a*.

The second sub PMIC 300*ba* receives the second sub enable signal EN_SUB2 that is activated through the second pin 301*b*, may activate a third sub enable signal EN_SUB3 in response to activation of the second sub enable signal EN_SUB2, and may provide the third sub enable signal EN_SUB3 that is activated to an adjacent sub PMIC through the third pin 302*b*.

The n-th sub PMIC 300*na* may receive an n-th sub enable signal EN_SUBn that is activated through the second pin 301*n*.

The first through n-th sub PMICs 300*aa*, 300*ba*, . . . , 300*na* may be connected to (or communicate with) the main PMIC 200*a* by, for example, a daisy chain configuration through the second pins 301*a*, 301*b*, . . . , 301*n* and the third pins 302*a*, 302*b*, . . . , 302*n*, may be provided with the activation of the first sub enable signal EN_SUB1 through the second pins 301*a*, 301*b*, . . . , 301*n* and the third pins 302*a*, 302*b*, . . . , 302*n* and may enable the second functions sequentially based on the battery voltage VBAT.

Figure 16:
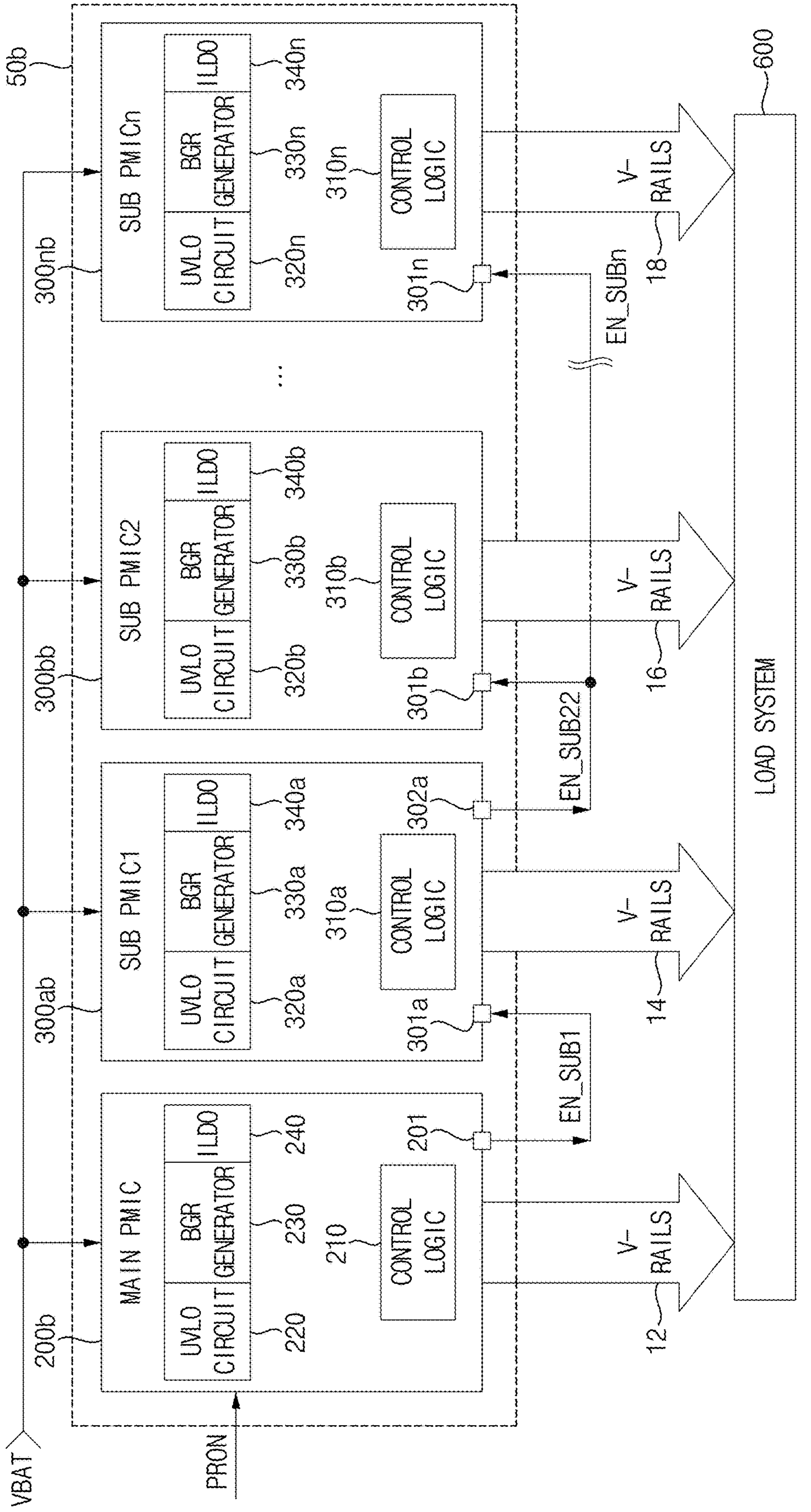
FIG. 16 is a block diagram illustrating an example of an electronic device according to some example embodiments.

FIG. 16 is a block diagram illustrating an example of an electronic device according to some example embodiments.

Referring to FIG. 16, an electronic device 10*b* may include a power management device 50*b* and a load system 600. According to some example embodiments, the load system 600 may correspond to the load system 1005 in FIG. 2.

The power management device 50*b* may include a main PMIC 200*b* and a plurality of sub PMICs 300*ab*, 300*bb*, . . . , 300*nb*. The plurality of sub PMICs 300*ab*, 300*bb*, . . . , 300*nb* may be referred to as first through n-th sub PMICs.

The battery voltage VBAT may be commonly supplied to the main PMIC 200*b* and the plurality of sub PMICs 300*ab*, 300*bb*, . . . , 300*nb* and the main PMIC 200*b* may receive a power-on signal PRON from an outside (e.g., the main processor 1800 in FIG. 2).

According to some example embodiments, each configuration of the main PMIC 200*b* and the plurality of sub PMICs 300*ab*, 300*bb*, . . . , 300*nb* may be substantially similar with each configuration of main PMIC 200 and the plurality of sub PMICs 300*a*, 300*b*, . . . , 300*n* in FIG. 3.

Each of the plurality of sub PMICs 300*ab*, 300*bb*, . . . , 300*nb* may include respective one of second pins 301*a*, 301*b*, . . . , 301*n* and the sub PMIC 300*ab* may further include a third pin 302*a*.

The main PMIC 200*b* performs first functions associated with a first initial operation and may apply a first sub enable signal EN_SUB1 to the first sub PMIC 300*ab* from among plurality of sub PMICs 300*ab*, 300*bb*, . . . , 300*nb* through the first pin 201 in response to an activation of the power-on signal PRON.

The first sub PMIC 300*ab* receives the first sub enable signal EN_SUB1 that is activated through the second pin 301*a*, activates a second sub enable signal EN_SUB22 in response to activation of the first sub enable signal EN_SUB1 and may provide the second sub enable signal EN_SUB22 that is activated to the second through n-th sub PMICs 300*bb*, 300*nb* through the third pin 302*a*.

The first sub PMIC 300*ab* may enable functions associated with a second initial operation in response to activation of the first sub enable signal EN_SUB1 and each of the second through n-th sub PMICs 300*bb*, . . . , 300*nb* may enable functions associated with a second initial operation in response to activation of the second sub enable signal EN_SUB22.

The n-th sub PMIC 300*nb* may receive an n-th sub enable signal EN_SUBn that is activated through the second pin 301*n*.

The first through n-th sub PMICs 300*ab*, 300*bb*, . . . , 300*nb* may be connected to (or communicate with) the main PMIC 200*b* by, for example, a daisy chain configuration through the second pins 301*a*, 301*b*, . . . , 301*n* and the third pin 302*a* may be provided with the activation of the first sub enable signal EN_SUB1 through the second pin 301*a* and the third pin 302*a* and may enable the second functions sequentially based on the battery voltage VBAT.

Figure 17:
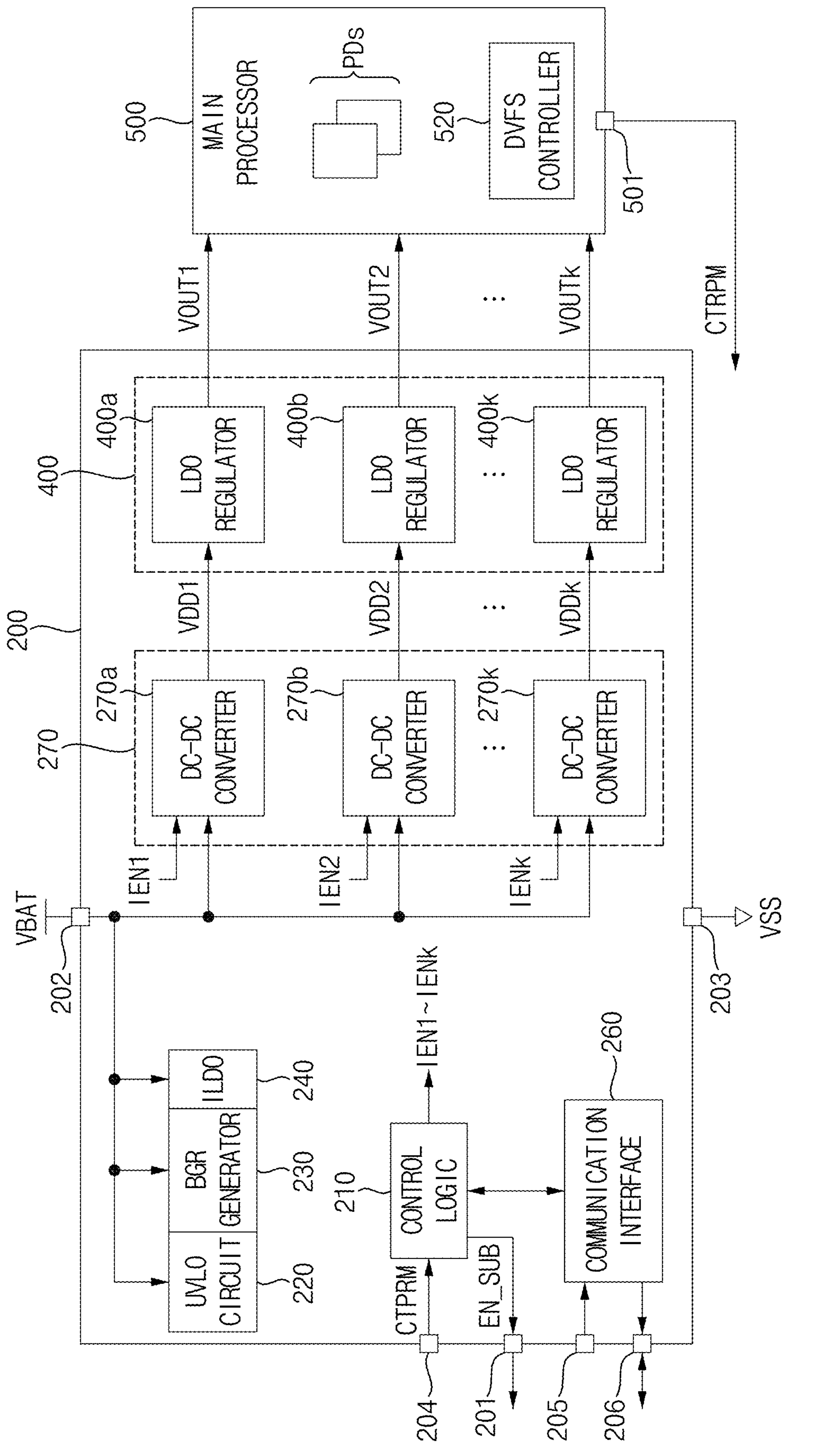
FIG. 17 is a block diagram illustrating a portion of an electronic device according to some example embodiments.

FIG. 17 is a block diagram illustrating a portion of an electronic device according to some example embodiments.

Referring to FIG. 17, an electronic device 20 may include the main PMIC 200 and the main processor 500.

FIG. 17 illustrates a connection relationship of the main PMIC 200 and the main processor 500 in FIG. 3 according to some example embodiments. The main processor 500 may correspond to the main processor 1800 in FIG. 2.

The main PMIC 200 may include the control logic 210, UVLO circuit 220, the BGR generator 230 and the ILDO regulator 240, and the first pin 201. In some example embodiments, the main PMIC 200 may further include a communication interface 260, a converter block 270, a regulator block 400 and a plurality of pins (e.g., terminals).

Descriptions of the control logic 210, UVLO circuit 220, the BGR generator 230 and the ILDO regulator 240, and the first pin 201 may be substantially the same as the descriptions corresponding to FIG. 6, and, therefore, may be omitted.

The main PMIC 200 may receive the battery voltage VBAT through terminal 202, may be connected to a ground voltage VSS through terminal 203, may communicate with the main processor 500 or a host through terminals 205 and 206 and may receive a power management control signal CTPRM from the main processor 500 through terminal 204.

The converter block 270 may include a plurality of DC-DC converters 270*a*, 270*b*, . . . , 270*k* that generate a plurality of power supply voltages VDD1, VDD2, . . . , VDDk based on the battery voltage VBAT. Here k may be a natural number greater than two. The regulator block 400 may include a plurality of low drop-out (LDO) regulators 400*a*, 400*b*, . . . , 400*k* that generate a plurality of output voltages VOUT1, VOUT2, . . . , VOUTk based on the plurality of power supply voltages VDD1, VDD2, . . . , VDDk.

The plurality of LDO regulators 400*a*, 400*b*, . . . , 400*k* may provide the plurality of output voltages VOUT1, VOUT2, . . . , VOUTk to power domains PDs in the main processor 500. The main processor 500 may include a dynamic voltage and frequency scaling (DVFS) controller 520. The DVFS controller 520 may perform DVFS on the power domains PDs by adjusting a frequency of each clock signals or adjusting the voltage level of each of the output voltages VOUT1, VOUT2, . . . , VOUTk.

The main processor 500 may provide the power management control signal CTRPM to the main PMIC 200 through a general purpose input/output (I/O) (GPIO) terminal 501.

The control logic 210 may control activation/deactivation of each of the DC-DC converters 270*a*, 270*b*, . . . , 270*k* in response to the power management control signal CTRPM. The control logic 210 may generate internal enable signals IEN1, IEN2, . . . , IENk in response to the power management control signal CTRPM, and may provide the internal enable signals IEN1, IEN2, . . . , IENk to respective DC-DC converters 270*a*, 270*b*, . . . , 270*k* in order to control activation/deactivation of the DC-DC converters 270*a*, 270*b*, . . . , 270*k*.

The communication interface 260 may communicate with the main processor 500 through terminals 205 and 206, and may variously communicate data as well as and signals with the control logic 210.

According to some example embodiments, each configuration of the plurality of sub PMICs 300*a*, 300*b*, . . . , 300*n* in FIG. 3 may be substantially similar with a configuration of the main PMIC 200 in FIG. 17.

According to some example embodiments, each of the plurality of sub PMICs 300*a*, 300*b*, . . . , 300*n* may include a plurality of DC-DC converters that generate a plurality of power supply voltages and a plurality of LDO regulators that generate a plurality of output voltages based on the plurality of power supply voltages.

Figure 18:
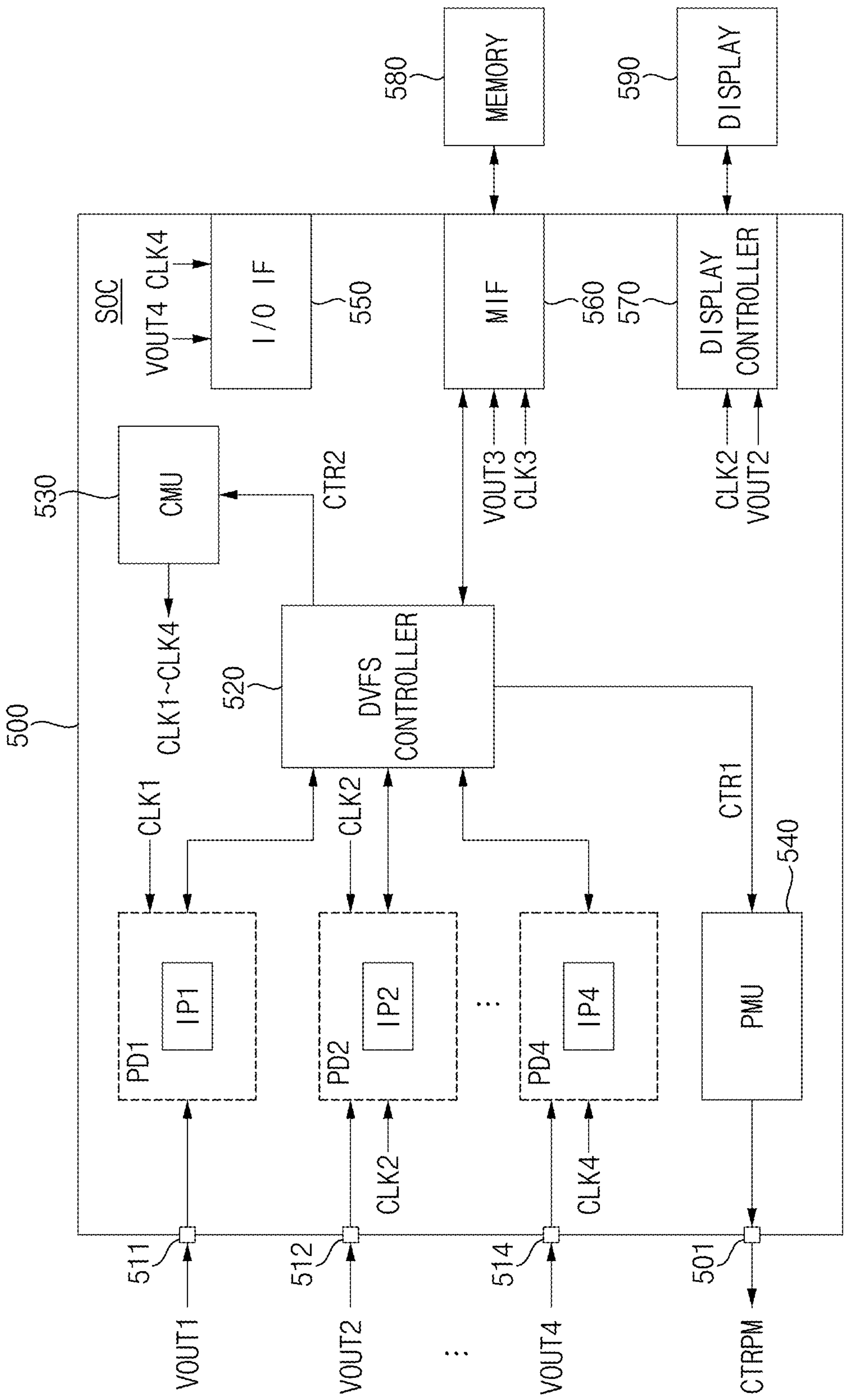
FIG. 18 is a block diagram illustrating an example of the main processor in the electronic device in FIG. 17 according to some example embodiments.

FIG. 18 is a block diagram illustrating an example of the main processor in the electronic device in FIG. 17 according to some example embodiments.

In FIG. 18, for example, the main processor 500 includes a plurality of power domains PD1, PD2, . . . , PD4.

Referring to FIGS. 17 and 18, in some example embodiments, the main processor 500 may include voltage terminals 511, 512, . . . , 514, a GPIO terminal 501, a plurality of function blocks IP1, IP2, . . . , IP4 and a DVFS controller 520. In some example embodiments, the main processor 500 may further include a clock management unit (CMU) 530, a power management unit (PMU) 540, a memory interface (MIF) 560, an I/O interface (I/O IF) 550 and a display controller 570.

In some example embodiments, the main processor 500 may be an application processor (AP), a mobile AP, or the like, but example embodiments are not limited thereto.

The memory interface 560 may be connected to an external memory 580 and the display controller 570 may be connected to an external display 590.

In some example embodiments, each of the plurality of function blocks IP1, IP2, . . . . IP4 may belong to respective one of different power domains PD1, PD2, . . . , PD4. In some example embodiments one or more function blocks may belong to each of the power domains PD1, PD2, . . . , PD4.

Each of the output voltages VOUT1, VOUT2, . . . , VOUT4 may be supplied to respective one of the power domains PD1, PD2, . . . , PD4 through respective one of the voltage terminals 511, 512, . . . , 514 and each of clock signals CLK1~CLK4 may be provided to respective one of the power domains PD1, PD2, . . . , PD4 from the CMU 530. Each of the function blocks IP1, IP2, . . . , IP4 belonging to respective one of the power domains PD1, PD2, . . . , PD4 may operate based on respective one of the output voltages VOUT1, VOUT2, . . . , VOUT4 and respective one of the clock signals CLK1~CLK4.

The DVFS controller 520 may perform DVFS on the power domains PD1, PD2, PD4 by adjusting a frequency of each of the clock signals CLK1~CLK4 and/or a voltage level of each of the output voltages VOUT1, VOUT2, . . . , VOUT4. According to some example embodiments, the DVFS technology represents a technology that dynamically controls or adjusts an operating frequency and an operating voltage of the main processor 500 to reduce power consumption.

The CMU 530 may generate the clock signals CLK1~CLK4 and may increase, maintain, or decrease the frequency of each of the clock signals CLK1~CLK4 based on a clock control signal CTR2 from the DVFS controller 520.

The PMU 540 may monitor the current power consumption of the main processor 500, may store the permitted power consumption of the main processor 500, and may compare the current power consumption with the permitted power consumption. The PMU 540 may generate the power control management control signal CTRPM for controlling the main PMIC 200 based on a power control signal CTR1 and/or a result of the comparing operation, and may provide the power control management control signal CTRPM to the main PMIC 200 through the GPIO terminal 501.

The memory interface 560 may control or facilitate data transfer between the main processor 500 and the memory device 580. For example, the memory interface 560 may operate based on the clock signal CLK3 and the output voltage VOUT3. The memory interface 560 may belong to the third power domain.

The memory device 580 may be disposed outside the main processor 500 and may exchange data with the main processor 500 via the memory interface 560. In some example embodiments, the memory device 580 may include at least one volatile memory such as a dynamic random access memory (DRAM), a synchronous DRAM (SDRAM), a static random access memory (SRAM), etc., and/or at least one nonvolatile memory such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM), etc., but example embodiments are not limited thereto. Alternatively, in some example embodiments, the memory device 580 may include a solid state drive or solid state disk (SSD), an embedded SSD (eSSD), a multimedia card (MMC), an embedded MMC (eMMC), a universal flash storage (UFS), etc., but example embodiments are not limited thereto.

The I/O interface 550 may control or facilitate data transfer between the main processor 500 and an external system (not illustrated). In some example embodiments, the I/O interface 550 may support a serial advanced technology attachment (SATA), a SATA express (SATAe), a SAS (serial attached small computer system interface (SCSI)), a peripheral component interconnect-express (PCIe®), a nonvolatile memory express (NVMe), or a mobile industry processor interface (MIPI®), but example embodiments are not limited thereto.

The display controller 570 may control or facilitate data transfer between the main processor 500 and the display 590. In some example embodiments, the display 590 may be disposed outside the main processor 500 and may display image data from the main processor 500. For example, the display 590 may operate based on the clock signal CLK2 and the output voltage VOUT2. The display controller 570 may belong to the second power domain.

In some example embodiments, at least a part of the DVFS controller 520, the CMU 530 and the PMU 540 may be implemented as hardware. For example, at least a part of the DVFS controller 520, the CMU 530 and the PMU 540 may be implemented as instructions or program routines (e.g., a software program). For example, the instructions or the program routines may be stored in an internal storage (not illustrated) included in the main processor 500 or the memory device 580 located outside the main processor 500, but example embodiments are not limited thereto.

Although not illustrated in FIG. 18, in some example embodiments, the main processor 500 may include a performance monitoring unit that measures or counts performance parameters of the function blocks IP1, IP2, . . . , IP4, the memory interface 560 and the display controller 570. For example, the performance parameters may include instruction cycles, workloads, cache hits, cache misses, branch misses, etc., but example embodiments are not limited thereto. The DVFS controller 520 may control DVFS based on measuring results of the performance monitoring unit.

Figure 19:
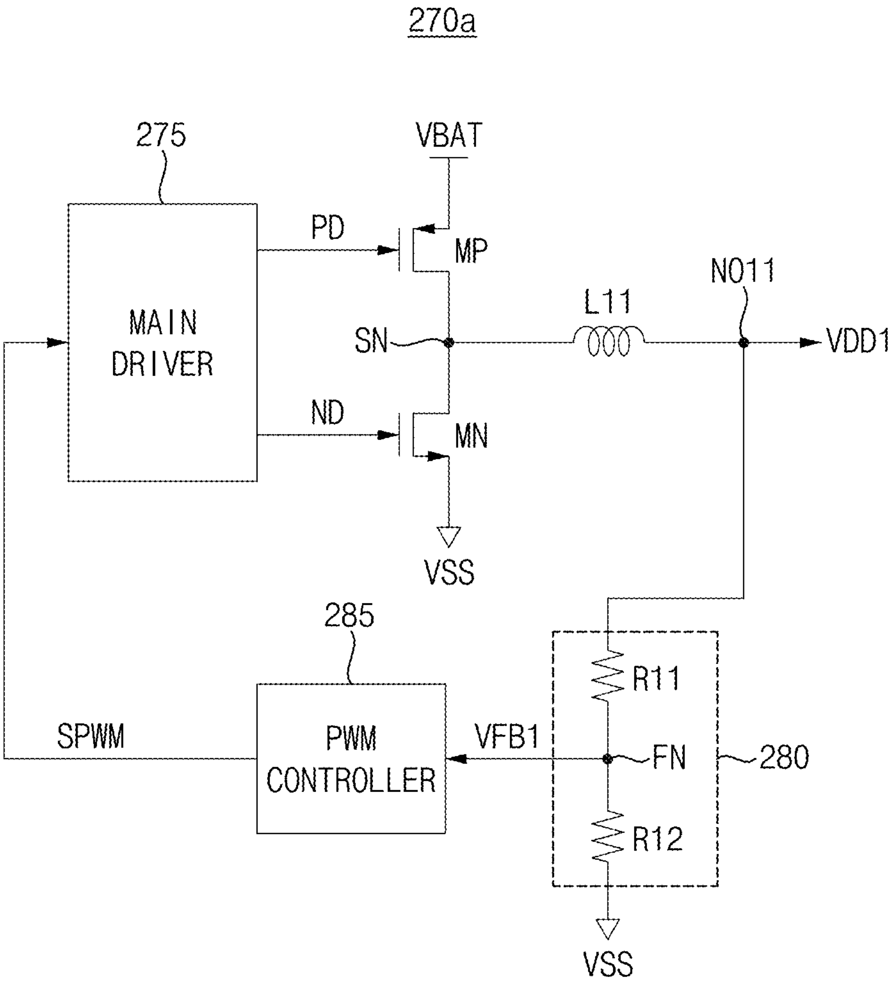
FIG. 19 is a block diagram illustrating one of the DC-DC converters in the PMIC in FIG. 17 according to some example embodiments.

FIG. 19 is a block diagram illustrating one of the DC-DC converters in the PMIC in FIG. 17 according to some example embodiments.

FIG. 19 illustrates a configuration of the DC-DC converter 270*a* according to some example embodiments, and each configuration of the DC-DC converters 270*b*, . . . , 270*k* may be substantially the same as the configuration of the DC-DC converter 270*a*.

Referring to FIG. 19, the DC-DC converter 270*a* may include a main driver 275, a first power switch MP, a second power switch MN, a feedback circuit 280 and a pulse width modulation (PWM) controller 285.

The first power switch MP may be coupled between the battery voltage VBAT and a switching node SN connected to the output node N011 and may include a PMOS transistor that has a source coupled to the battery voltage VBAT, a gate receiving a first driving control signal PD and a drain coupled to the switching node SN. The second power switch MN may be coupled between the switching node SN and a ground voltage VSS. The second power switch MP may include an NMOS transistor which has a drain coupled to the switching node SN, a gate receiving a second driving control signal ND and a source coupled to the ground voltage VSS.

The PWM controller 285 may generate a PWM signal SPWM based on a feedback voltage VFB1 which is proportional to the power supply voltage VDD1. The PWM controller 285 may generate the PWM signal SPWM by performing a PWM on the feedback voltage VFB1.

The feedback circuit 280 may generate the feedback voltage VFB1 which is proportional to the power supply voltage VDD1 and may provide the feedback voltage VFB1 to the PWM controller 285. The feedback circuit 280 may include dividing resistors R11 and R12 connected between an output node N011 and the ground voltage VSS and the dividing resistors R11 and R12 may be connected to each other at a feedback node FN.

For example, as illustrated in FIG. 19, the feedback circuit 280 may generate the feedback voltage VFB1 corresponding to a ratio of resistance values of the dividing resistors R11 and R12, but example embodiments are not limited thereto.

As illustrated in FIG. 19, in some example embodiments, each of the DC-DC converters 270*a*, 270*b*, . . . , 270*k* may include a buck converter. The buck converter may receive the battery voltage VBAT and may generate a power supply voltage whose level is relatively smaller than the level of the battery voltage VBAT, based on the battery voltage VBAT.

Figure 20:
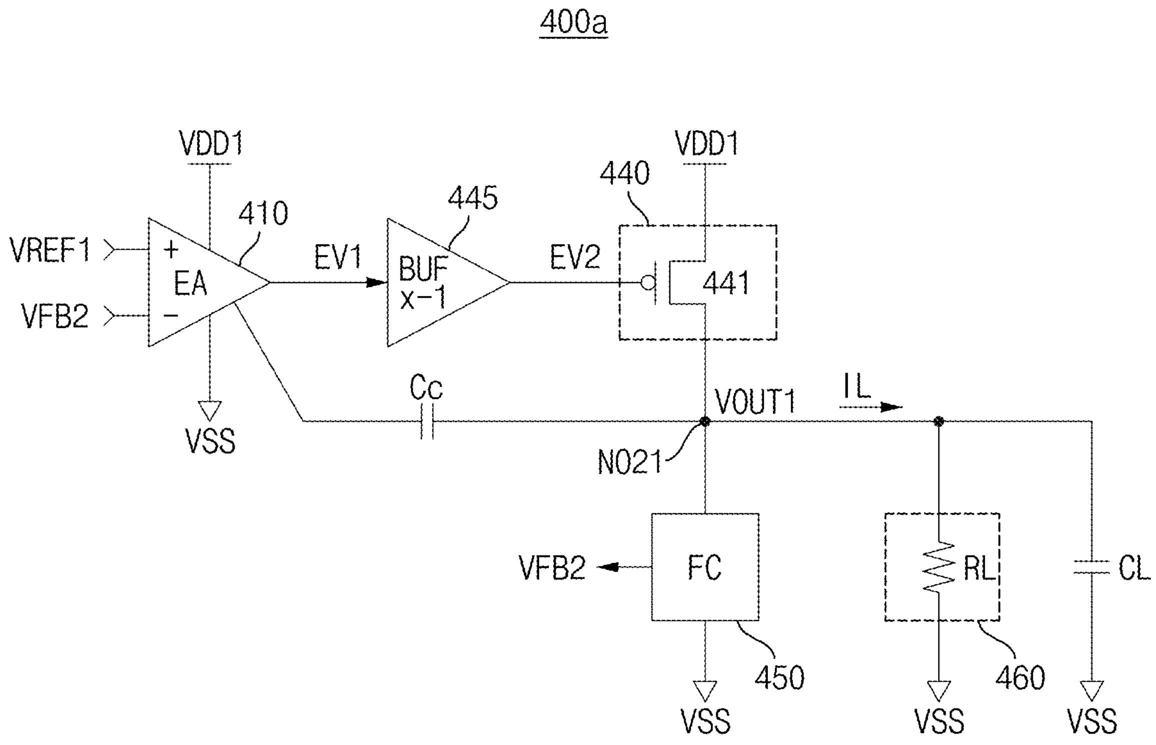
FIG. 20 is a block diagram illustrating one of the LDO regulators in the main PMIC in FIG. 17 according to some example embodiments.

FIG. 20 is a block diagram illustrating one of the LDO regulators in the main PMIC in FIG. 17 according to some example embodiments.

FIG. 20 illustrates a configuration of the LDO regulator 400*a* according to some example embodiments, and each configuration of the LDO regulators 400*b*, . . . , 400*k* may be substantially the same as the configuration of the LDO regulator 400*a*.

Referring to FIG. 20, in some example embodiments, the LDO regulator 400*a* may include an error amplifier (EA) 410, a buffer (BUF) 445, a pass element 440 including a power transistor 441, and a feedback circuit (FC) 450.

In some example embodiments, the LDO regulator 400*a* may further include a compensation capacitor Cc. The compensation capacitor Cc is connected between an internal node of the error amplifier 410 and an output node N021.

In FIG. 20, a load 460 and a load capacitor CL according to some example embodiments which are connected between the output node N021 and the ground voltage VSS are also illustrated. The load capacitor CL is connected between the output node N021 and the ground voltage VSS in parallel with respect to the load capacitor CL. The load 460 may include a load resistor RL.

The error amplifier 410 may be connected between the power supply voltage VDD1 and the ground voltage VSS, may receive a reference voltage VREF1 and a feedback voltage VFB2, may compare the reference voltage VREF1 and the feedback voltage VFB2, may amplify a difference between the reference voltage VREF1 and the feedback voltage VFB2 based on the comparison to generate a first error voltage EV1 corresponding to the difference and may output the first error voltage EV1 to the buffer 445.

In some example embodiments, the first error voltage EV1 may correspond to the difference between the reference voltage VREF1 and the feedback voltage VFB2. According to some example embodiments, the error amplifier 410 has a positive (+) input terminal to receive the reference voltage VREF1 and a negative (−) input terminal to receive the feedback voltage VFB2.

The buffer 445 may buffer the first error voltage EV1 and may output a second error voltage EV2 to a gate of the power transistor 441. The buffer 445 may have a gain of −1.

The power transistor 441 may have a gate receiving the second error voltage EV2, and may regulate the power supply voltage VDD1 based on the second error voltage EV2 to provide the output voltage VOUT1 to the output node N021. A load current IL corresponding to the output voltage VOUT1 is provided to the load 460 from the output node N021.

According to some example embodiments, the power transistor 441 has a source coupled to the power supply voltage VDD1, a gate to receive the second error voltage EV2 and a drain coupled to the output node N021. In some example embodiments, when the load current IL increases, a voltage level of the output voltage VOUT1 decreases and a voltage level of the first error voltage EV1 increases. For example, a voltage level of the second error voltage EV2 decreases in response to the level of the first error voltage EV1 increasing. In some example embodiments, when the voltage level of the second error voltage EV2 decreases, the voltage level of the output voltage VOUT1 increases.

In some example embodiments, when the load current IL decreases, the voltage level of the output voltage VOUT1 increases and the voltage level of the first error voltage EV1 decreases. For example, the voltage level of the second error voltage EV2 increases in response to the voltage level of the first error voltage EV1 decreasing. In some example embodiments, when the voltage level of the second error voltage EV2 increases, the voltage level of the output voltage VOUT1 decreases.

Therefore, in some example embodiments, when the load current IL increases, the voltage level of the second error voltage EV2 decreases and when the load current IL decreases, the voltage level of the second error voltage EV2 increases.

The feedback circuit 450 may be connected between the output node N021 and the ground voltage VSS, may generate the feedback voltage VFB2 by dividing the output voltage VOUT1 and may provide the feedback voltage VFB2 to the error amplifier 410.

Figure 21:
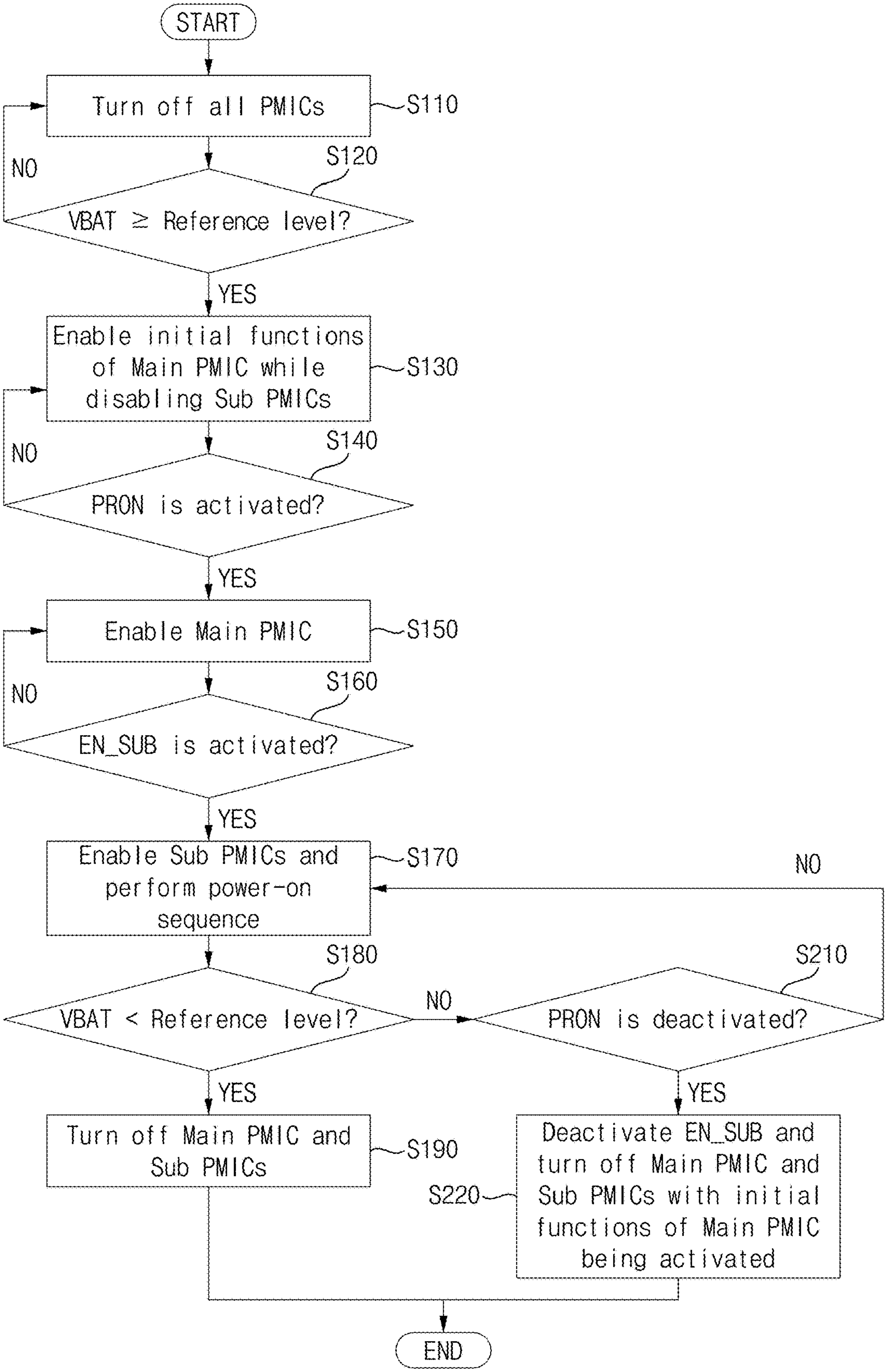
FIG. 21 is a flow chart illustrating a method of operating a main PMIC and a plurality of sub PMICs in FIG. 3 according to some example embodiments.

FIG. 21 is a flow chart illustrating a method of operating a main PMIC and a plurality of sub PMICs in FIG. 3 according to some example embodiments.

Referring to FIGS. 3 through 8 and 21, all PMICs (e.g., the main PMIC 200 and the plurality of sub PMICs 300*a*, 300*b*, . . . , 300*n*) are turned off (operation S110).

In some example embodiments, the UVLO circuit 220 in the main PMIC 200 determines whether the battery voltage VBAT reaches (e.g., is greater than or equal to) a reference level VL_REF (operation S120). In some example embodiments, when the battery voltage VBAT is smaller than the reference level VL_REF (NO in operation S120), a process returns to the operation S110 (e.g., all PMICs are turned off).

In some example embodiments, when the battery voltage VBAT reaches (e.g., is greater than or equal to) the reference level VL_REF (YES in operation S120), the main PMIC 200 enables initial functions of the main PMIC 200 while disabling the plurality of sub PMICs 300*a*, 300*b*, . . . , 300*n* (operation S130).

In some example embodiments, the main PMIC 200 determines whether the power-on signal PRON is activated (operation S140). In some example embodiments, when the power-on signal PRON is not activated (NO in operation S140), the process returns to the operation S130.

In some example embodiments, when the power-on signal PRON is activated (YES in operation S140), the main PMIC 200 is enabled (operation S150), the main PMIC 200 (or the control logic 210) determines whether the sub enable signal EN_SUB is activated (operation S160). In some example embodiments, when the sub enable signal EN_SUB is not activated (NO in operation S160), the process returns to the operation S150.

In some example embodiments, when the sub enable signal EN_SUB is activated (YES in operation S160), the plurality of sub PMICs 300*a*, 300*b*, . . . , 300*n* are enabled and a power-on sequence is performed (operation S170).

In some example embodiments, the UVLO circuit 220 in the main PMIC 200 determines whether the battery voltage VBAT drops below the reference level VL_REF (operation S180). In some example embodiments, when the battery voltage VBAT drops below the reference level VL_REF (YES in operation S180), all PMICs (e.g., the main PMIC 200 and the plurality of sub PMICs 300*a*, 300*b*, . . . , 300*n*) are turned off (operation S190).

In some example embodiments, when the battery voltage VBAT does not drop below the reference level VL_REF (NO in operation S180), the main PMIC 200 determines whether the power-on signal PRON is deactivated (operation S210). In some example embodiments, when the power-on signal PRON is not deactivated (NO in operation S210), the process returns to the operation S170.

In some example embodiments, when the power-on signal PRON is deactivated (YES in operation S210), the sub enable signal EN_SUB is deactivated and all PMICs (e.g., the main PMIC 200 and the plurality of sub PMICs 300*a*, 300*b*, . . . , 300*n*) are turned off while the initial functions of the main PMIC 200 are enabled (operation S220).

Figure 22:
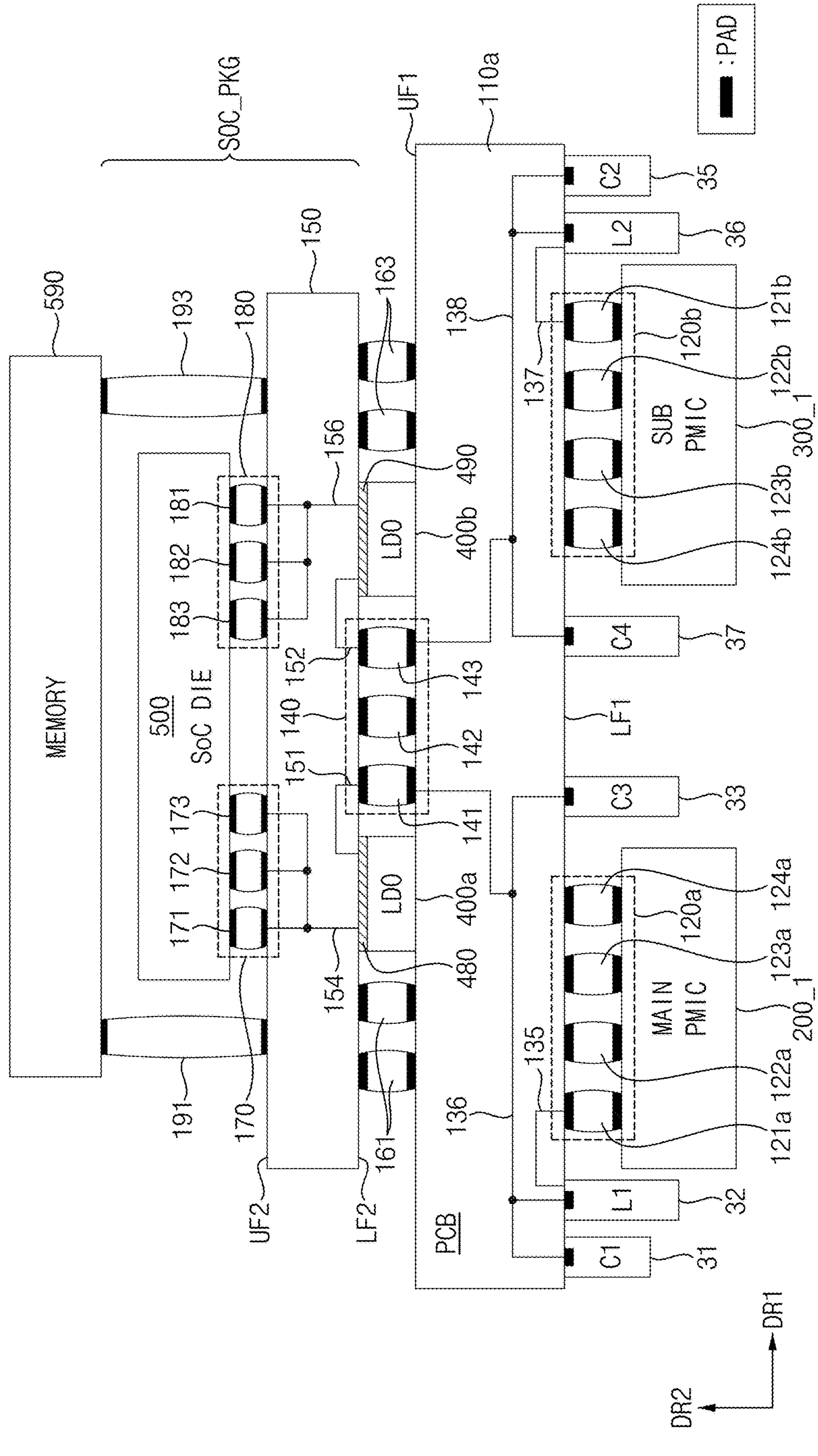
FIG. 22 is a block diagram illustrating a mobile device according to some example embodiments.

FIG. 22 is a block diagram illustrating a mobile device according to some example embodiments.

In some example embodiments, the mobile device 30 illustrated in FIG. 22 may correspond to the electronic device 10 of FIG. 3.

According to some example embodiments, the mobile device 30 may include a printed circuit board (PCB) 110*a* and a plurality of (electronic) components disposed on the PCB 100*a*.

In some example embodiments, the PCB 110*a* may include electrical (e.g., electrically conductive) paths along which at least one component mounted on and attached to the first side UF1 of the PCB 110*a* and at least one component mounted on and attached to the second side LF1 of the PCB 110*a* are electrically connected. For example, operating voltages (e.g., power and/or ground) and signals are transmitted along the electrical paths.

According to some example embodiments, PCB 110*a* may refer to a circuit board or a substrate which is capable of providing electrical paths (or, electrical communication paths) between at least one component mounted on and attached to the first side UF1 of the PCB 110*a* and at least one component mounted on and attached to the second side LF1 of the PCB 110*a*.

In some example embodiments, PCB 110*a* may include one or more dielectric material (e.g., insulating) layers, a plurality of metal (e.g., wiring) layers separated from each other by the dielectric material (e.g., insulating) layer(s), and conductive vias extending through the dielectric material layer(s) and electrically connecting the metal (e.g., wiring) layers to each other, but example embodiments are not limited thereto.

Referring to FIG. 22, in some example embodiments, the mobile device 30 may include the PCB 110*a*, a package substrate 150, a main PMIC 200_1, a sub PMIC 300_1, passive components 31, 32, 33, 35, 36 and 37, LDO regulators 400*a* and 400*b*, an integrated circuit (SoC die) 500 corresponding to, for example, the main processor 500 illustrated in FIG. 17 or the main processor 1800 illustrated in FIG. 2, and a memory 590. The mobile device 30 may further include high density capacitors 480 and 490 respectively between a second side LF2 of the package substrate 150 and the LDO regulators 400*a* and 400*b*.

The package substrate 150 may be attached to the first side UF1 of PCB 110*a* by first interconnects 140, 161 and 163. The package substrate 150 may have a first side UF2 and a second side LF2 opposite of the first side UF2.

According to some example embodiments, each of the first interconnects 140, 161 and 163 may include at least one of a conductive pad or land of conductive material such as copper, a pin, and a solder bump (e.g., a ball or the like of solder), but example embodiments are not limited thereto. The first interconnects 140 may include first balls 141, 142 and 143.

In some example embodiments, the SoC die 500 may be attached to the first side UF2 of the package substrate 150 by third interconnects 170 and 180. The third interconnects 170 and 180 may include at least one of a conductive pad or land of conductive material such as copper, a pin, and a solder bump (e.g., a ball or the like of solder), but example embodiments are not limited thereto. The third interconnect 170 may include balls 171, 172 and 173 and the third interconnect 180 may include balls 181, 182 and 183.

In some example embodiments, the memory 590 may be attached to the first side UF2 of the package substrate 150 by fourth interconnects 191 and 193 and the memory 590 may lie over (e.g., overlap) the SoC die 500. The fourth interconnects 191 and 193 may include at least one of a conductive pad or land of conductive material.

In some example embodiments, the main PMIC 200_1 and the sub PMIC 300_1 may be spaced apart in a first direction DR1. Although, one sub PMIC 300_1 is illustrated in FIG. 22, in some example embodiments a plurality of sub PMICs may be distributed and mounted on the second side LF1 of the PCB 110*a*.

According to some example embodiments, each of the PCB 110*a* and the package substrate 150 may have a corresponding length extending in the first direction DR1 and a corresponding thickness extending in a second direction DR2.

In some example embodiments, the respective passive components 31, 32, 33, 35, 36 and 37 may be variously mounted on the second side LF1 of the PCB 110*a* using pads and/or lands. The passive components 31, 32, 33, 35, 36 and 37 may include, for example: a first capacitor (C1) 31 and a first inductor (L1) 32 associated with an output of the main PMIC 200_1, a third capacitor (C3) 33 associated with an input of the LDO regulator 400*a*, as well as a second capacitor (C2) 35 and a second inductor (L2) 36 associated with an output of the sub PMIC 300_1, and a fourth capacitor (C4) 37 associated with an input of the LDO regulator 400*b*.

In some example embodiments, the main PMIC 200_1 may be mounted on the second side LF1 of the PCB 110*a* using second interconnects 120*a*. Here, the second interconnects 120*a* may include balls 121*a*, 122*a*, 123*a* and 124*a*. The ball 121*a* may be coupled to the main PMIC 200_1 and the first inductor (L1) 32 through a first electrical path 135. Therefore, in some example embodiments, a power supply voltage generated by the main PMIC 200_1 may be provided to the LDO regulator 400*a* through the first capacitor (C1) 31, the first inductor (L1) 32, the third capacitor (C3) 33, the first electrical paths 135 and 136, and the ball 141.

In some example embodiments, sub PMIC 300_1 may be mounted on the second side LF1 of the PCB 110*a* by second interconnects 120*b*. Here, the second interconnects 120*b* may include balls 121*b*, 122*b*, 123*b* and 124*b*. The ball 121*b* may be coupled to the sub PMIC 300_1 and the second inductor (L2) 36 through a second electrical path 137. Therefore, in some example embodiments, a power supply voltage generated by the sub PMIC 300_1 may be provided to the LDO regulator 400*b* through the second capacitor (C2) 35, the second inductor (L2) 36, the fourth capacitor (C4) 37, the second electrical paths 137 and 138, and the ball 143.

In some example embodiments, the LDO regulator 400*a* may generate an output voltage in response to (or based on) the received power supply voltage, and may provide the generated output voltage to a corresponding power domain of the SoC die 500 through the high density capacitor 480, the electrical path 154 and the balls 171, 172 and 173. For example, the high density capacitor 480 may operate as an output capacitor of the LDO regulator 400*a*.

In some example embodiments, the LDO regulator 400*b* may generate an output voltage in response to (or based on) the received power supply voltage, and may provide the generated output voltage to a corresponding power domain of the SoC 500 through the high density capacitor 490, the electrical path 156 and the balls 181, 182 and 183. For example, the high density capacitor 490 may operate as an output capacitor of the LDO regulator 400*b*.

According to some example embodiments, because the LDO regulators 400*a* and 400*b* are mounted on the second side LF2 of the package substrate 150, instead of the LDO regulators 400*a* and 400*b* being included in the main PMIC 200_1 and the sub PMIC 300_1, the number of electrical paths (e.g., power rails) needed to transfer power supply voltages to the LDO regulators 400*a* and 400*b* from the main PMIC 200_1 and the sub PMIC 300_1 may be reduced in relation to conventional designs.

In some example embodiments, because the LDO regulators 400*a* and 400*b* are mounted on the second side LF2 of the package substrate 150 instead of the LDO regulators 400*a* and 400*b* being included in the main PMIC 200_1 and the sub PMIC 300_1, each of the LDO regulators 400*a* and 400*b* may provide an output voltage to a corresponding power domain through a reduced number of balls 171, 172, 173, 181, 182 and 183, as compared with conventional designs.

In FIG. 22, the LDO regulators 400*a* and 400*b*, the package substrate 150 and the SoC die 500 may be combined in an IC package (e.g., a SoC package or SOC_PKG).

Figure 23:
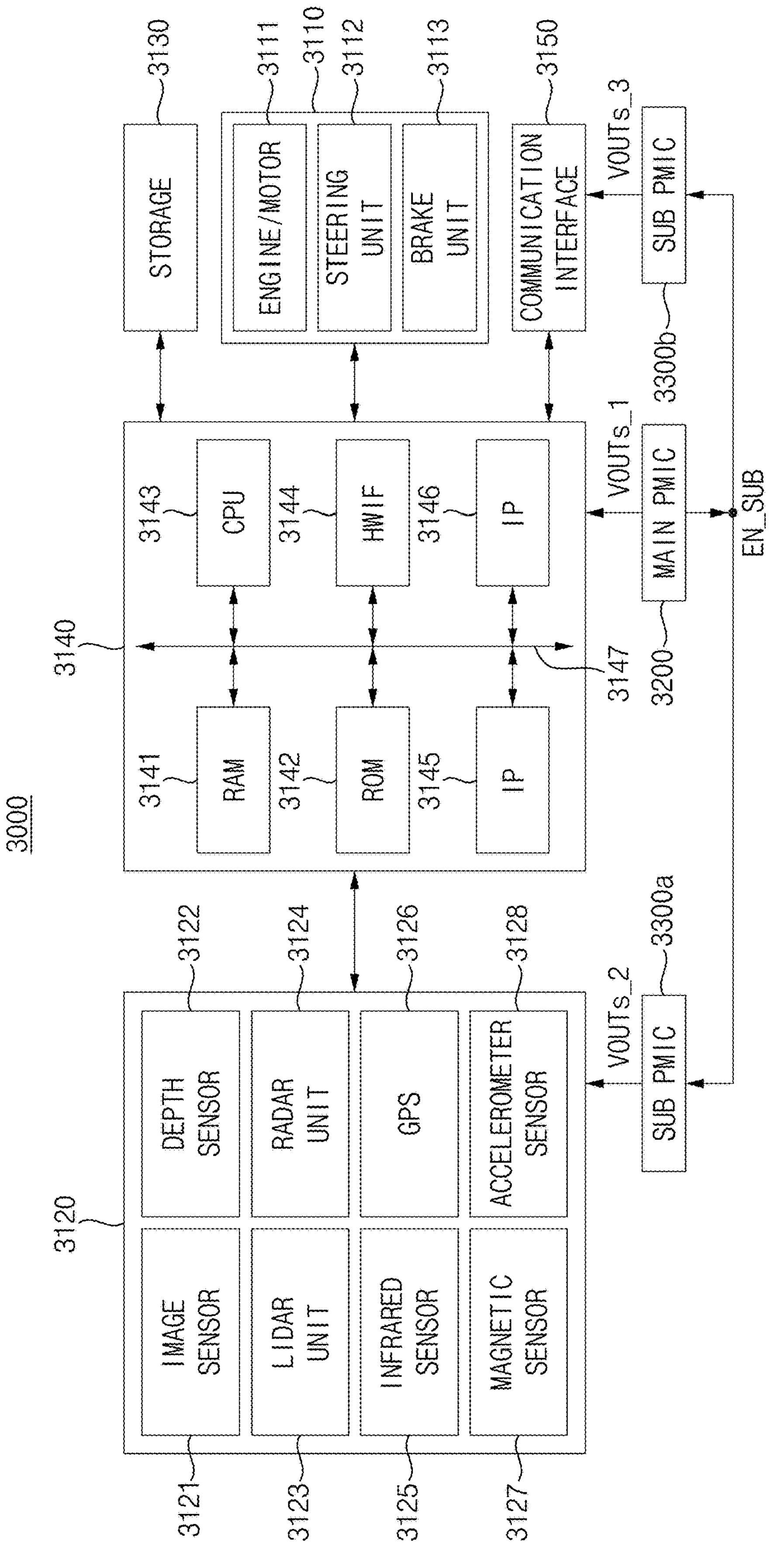
FIGS. 23 and 24 are diagrams illustrating an autonomous driving system according to some example embodiments.
Figure 24:
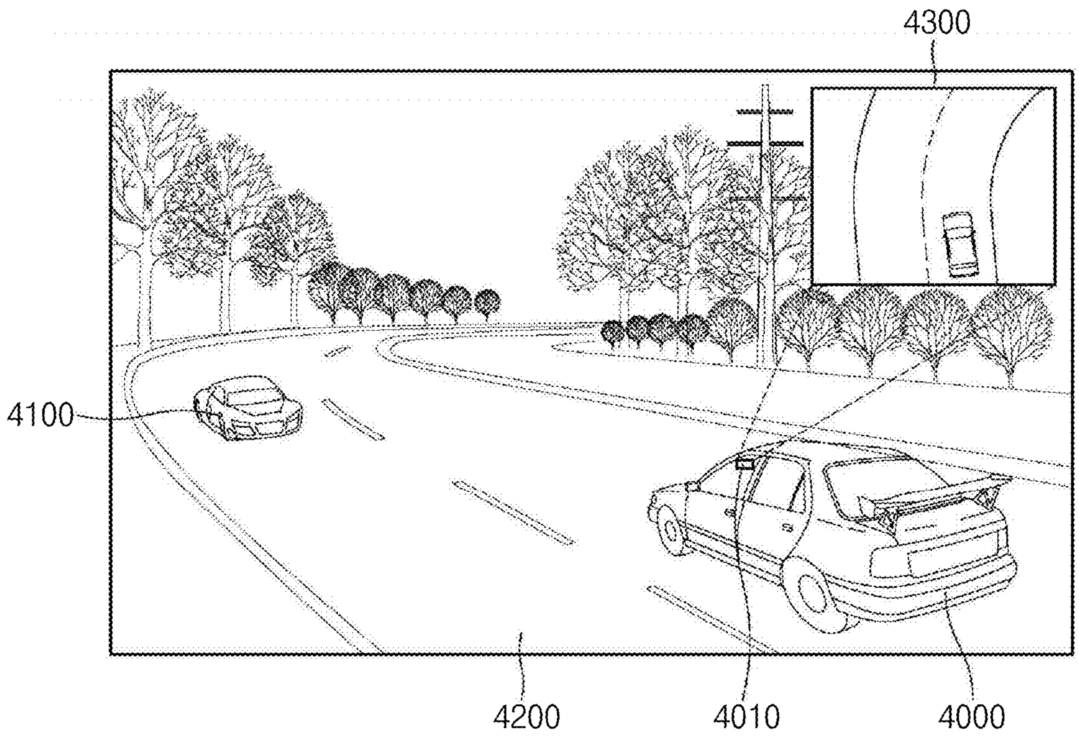

FIGS. 23 and 24 are diagrams illustrating an autonomous driving system according to some example embodiments.

Referring to FIG. 23, in some example embodiments, an autonomous driving system 3000 may include a driver (e.g., including circuitry) 3110, a sensor 3120, a storage 3130, a controller (e.g., including processing circuitry) 3140, a communication interface 3150, a main PMIC 3200 and sub PMICs 3300*a* and 3300*b*.

The driver 3110 may, for example, be a configuration for driving the autonomous driving system 3000 and may include various circuitry. In some example embodiments, when the autonomous driving system 3000 is implemented with an autonomous vehicle, the driver 3110 may include various circuitry and/or components, such as, for example, an engine/motor 3111, a steering unit 3112, a brake unit 3113, and/or the like, but example embodiments are not limited thereto.

The sensor 3120 may include a number of sensors configured to sense information relating to a surrounding environment of the autonomous driving system 3000. For example, the sensor 3120 may include at least one of an image sensor 3121, a depth sensor 3122, a light detection and ranging (LIDAR) unit 3123, a radio detection and ranging (RADAR) unit 3124, an infrared sensor 3125, a global positioning system (GPS) 3126, a magnetic sensor 3127, and/or an accelerometer sensor 3128, but example embodiments are not limited thereto.

The controller 3140 may include a random access memory (RAM) 3141, a read-only memory (ROM) 3142, a central processing unit (CPU) 3143, a hardware interface device (HWIF) 3144, a plurality of intellectual property protected devices (IPs) 3145 and 3146, and a bus 3147. The storage 3130 may store data necessary for the controller 3140 to execute various processes. The communication interface 3150 may include various communication circuits and may be configured to facilitate communication between the autonomous driving system 3000 and an external device.

The main PMIC 3200 may provide output voltages VOUTs_1 to the controller 3140.

The main PMIC 3200 may enable initial functions based on a battery voltage, may activate a sub enable signal EN_SUB in response to an activation of a power-on signal and may apply the sub enable signal EN_SUB that is activated to the sub PMICs 3300*a* and 3300*b*. The sub PMICs 3300*a* and 3300*b* may enable corresponding initial functions based on the sub enable signal EN_SUB that is activated and may perform a power-on sequence. The sub PMIC 3300*a* may provide output voltages VOUTs_2 to the sensor 3120 and the sub PMIC 3300*b* may provide output voltages VOUTs_3 to the communication interface 3150.

Referring to FIG. 24, in some example embodiments, an autonomous driving system 4010 may be installed in an autonomous vehicle 4000. For example, the autonomous driving system 4010 may detect a road 4200 including a fixed pattern and another vehicle 4100 moving in time, by analyzing the at least one image sequence 4300 received from at least one camera.

The present inventive concepts may be applied to a PMIC, an SoC, and various devices and systems including the PMIC and the SoC, such as a mobile phone, a smart phone, a PDA, a PMP, a digital camera, a digital television, a set-top box, a music player, a portable game console, a navigation device, a PC, a server computer, a workstation, a tablet computer, a laptop computer, a smart card, a printer, a wearable device, an IoT device, an IoE device, an e-book, a VR device, an AR device, a robotic device, etc., but example embodiments are not limited thereto.

As described herein, one or more of the elements disclosed above may include or be implemented in one or more processing circuitries such as hardware including logic circuits; a hardware/software combination such as a processor executing software; or a combination thereof. For example, the processing circuitries more specifically may include, but are not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

As described herein, any devices, electronic devices, modules, models, units, and/or portions thereof may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphic processing unit (CPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the example embodiments.

Any of the memories described herein may be a non-volatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

While the present inventive concepts have been shown and described with reference to some example embodiments thereof, it will be understood by those of ordinary skill in the art that various changes in form and detail may be made therein without departing from the spirit and scope of the present inventive concepts as defined by the following claims.

What is claimed is:

1. A power management device comprising:
- a main power management integrated circuit (PMIC); and
- at least one sub PMIC configured to communicate with the main PMIC through a dedicated pin,
- wherein the main PMIC includes a first pin and is configured to:
  - enable first functions associated with a first initial operation based on a battery voltage during a stand-by period before generating first output voltages based on the battery voltage; and
  - apply a first sub enable signal to the at least one sub PMIC through the first pin based on a power-on signal after completing the first initial operation, and
- wherein the at least one sub PMIC includes a second pin and is configured to:
  - receive the first sub enable signal through the second pin; and
  - enable second functions associated with a second initial operation based on the battery voltage, in response to an activation of the first sub enable signal.

2. The power management device of claim 1, wherein the at least one sub PMIC includes first through n-th sub PMICs, respective one of the first through n-th sub PMICs configured to communicate with the main PMIC through the second pin, n being a natural number greater than two,
- wherein each of the first through n-th sub PMICs is configured to receive the first sub enable signal through the second pin commonly and enable the second functions concurrently based on the battery voltage, in response to the activation of the first sub enable signal.

3. The power management device of claim 1, wherein the at least one sub PMIC includes first through n-th sub PMICs configured to communicate with the main PMIC by a daisy chain configuration,
- wherein each of the first through n-th sub PMICs further includes a third pin, and
- wherein the first through n-th sub PMICs are provided with the activation of the first sub enable signal through the second pin and the third pin and enable the second functions sequentially based on the battery voltage.

4. The power management device of claim 1, wherein the at least one sub PMIC includes first through n-th sub PMICs,
- wherein the first sub PMIC further includes a third pin and is configured to:
- enable the second functions based on the battery voltage, in response to the activation of the first sub enable signal; and
- apply a second sub enable signal to the second through n-th sub PMICs through the third pin, and
- wherein each of the second through n-th sub PMICs is configured to enable the second functions concurrently in response to the activation of the second sub enable signal.

5. The power management device of claim 1, wherein the main PMIC includes:
- an under voltage lock-out circuit configured to compare the battery voltage with a reference level and generate a voltage level detection signal which is activated in response to the battery voltage reaching the reference level;
- a reference voltage generator configured to generate a reference voltage in response to an activation of the voltage level detection signal;
- an internal low drop-out (LDO) regulator configured to generate an internal voltage based on the reference voltage and the battery voltage; and
- a control logic configured to activate the first sub enable signal based on the activation of the voltage level detection signal, the reference voltage reaching a target level and an activation of the power-on signal, and apply the first sub enable signal to the at least one sub PMIC through the first pin.

6. The power management device of claim 5, wherein the main PMIC is configured to transit from a stand-by state to an on state in response to the activation of the power-on signal.

7. The power management device of claim 5, wherein the internal LDO regulator is configured to generate the internal voltage in response to the reference voltage reaching the target level.

8. The power management device of claim 5, wherein the main PMIC further includes:
- a plurality of direct current (DC)-DC converters configured to generate a plurality of power supply voltages based on the battery voltage; and
- a plurality of low drop-out (LDO) regulators configured to generate a plurality of output voltages by regulating the plurality of power supply voltages and provide the plurality of output voltages to a load system.

9. The power management device of claim 8, wherein each of the plurality of DC-DC converters includes a buck converter.

10. The power management device of claim 1, wherein the at least one sub PMIC includes:

an under voltage lock-out circuit configured to compare the battery voltage with a reference level in response to the activation of the first sub enable signal and generate a voltage level detection signal configured to activate in response to the battery voltage reaching the reference level;

a reference voltage generator configured to generate a reference voltage in response to the activation of the first sub enable signal and an activation of the voltage level detection signal;

an internal low drop-out (LDO) regulator configured to generate an internal voltage based on the reference voltage and the battery voltage, in response to the activation of the first sub enable signal; and a control logic configured to perform a power-on sequence based on the activation of the first sub enable signal, the activation of the voltage level detection signal and the reference voltage reaching a target level.

11. The power management device of claim 10, wherein the at least one sub PMIC is configured to transit from a stand-by state to an on state in response to the activation of the first sub enable signal.

12. The power management device of claim 10, wherein the at least one sub PMIC further includes:

a plurality of direct current (DC)-DC converters configured to generate a plurality of power supply voltages based on the battery voltage; and a plurality of low drop-out (LDO) regulators configured to generate a plurality of output voltages by regulating the plurality of power supply voltages and provide the plurality of output voltages to a load system.

13. The power management device of claim 10, wherein the internal LDO regulator is configured to generate the internal voltage in response to the reference voltage reaching the target level.

14. The power management device of claim 1, wherein the at least one sub PMIC includes:

a power switch circuit configured to selectively transfer the battery voltage based on the first sub enable signal;

an under voltage lock-out circuit, connected to the power switch circuit, configured to compare the battery voltage with a reference level and generate a voltage level detection signal configured to activate in response to the battery voltage reaching the reference level;

a reference voltage generator, connected to the power switch circuit, configured to generate a reference voltage in response to an activation of the voltage level detection signal;

an internal low drop-out (LDO) regulator configured to generate an internal voltage based on the reference voltage and the battery voltage, in response to the activation of the first sub enable signal; and a control logic configured to perform a power-on sequence based on the activation of the first sub enable signal, the activation of the voltage level detection signal and the reference voltage reaching a target level.

15. The power management device of claim 14, wherein the power switch circuit includes one pair of a first p-channel metal-oxide semiconductor (PMOS) transistor and a second PMOS transistor, a first n-channel metal-oxide semiconductor (NMOS) transistor and a second NMOS transistor and a first transmission gate and a second transmission gate, wherein the first PMOS transistor is configured to transfer the battery voltage to the under voltage lock-out circuit based on an inverted first sub enable signal obtained by inverting the first sub enable signal and the second PMOS transistor is configured to transfer the battery voltage to the reference voltage generator based on the inverted first sub enable signal, wherein the first NMOS transistor is configured to transfer the battery voltage to the under voltage lock-out circuit based on the first sub enable signal and the second NMOS transistor is configured to transfer the battery voltage to the reference voltage generator based on the first sub enable signal, and the first transmission gate is configured to transfer the battery voltage to the under voltage lock-out circuit based the first sub enable signal and the inverted first sub enable signal and the second transmission gate is configured to transfer the battery voltage to the reference voltage generator based on the first sub enable signal and the inverted first sub enable signal.

16. An electronic device comprising:

a main processor including a plurality of first power domains; and a power management device configured to generate a plurality of output voltages in association with a power sequence of the plurality of first power domains, and provide the plurality of output voltages to the plurality of first power domains through voltage rails, wherein the power management device includes:

a main power management integrated circuit (PMIC) configured to communicate with the main processor through a system bus; and at least one sub PMIC configured to communicate with the main PMIC through a dedicated pin, wherein the main PMIC includes a first pin and is configured to:

enable first functions associated with a first initial operation during a stand-by period before generating first output voltages based on a battery voltage; and apply a first sub enable signal to the at least one sub PMIC through the first pin based on a power-on signal after completing the first initial operation, and wherein the at least one sub PMIC includes a second pin and is configured to:

receive the first sub enable signal through the second pin; and enable second functions associated with a second initial operation based on the battery voltage, in response to an activation of the first sub enable signal.

17. The electronic device of claim 16, wherein the at least one sub PMIC includes first through n-th sub PMICs, respective one of the first through n-th sub PMICs configured to communicate with the main PMIC through the second pin, n being a natural number greater than two, wherein each of the first through n-th sub PMICs is configured to receive the first sub enable signal through the second pin commonly and enable the second functions concurrently based on the battery voltage, in response to the activation of the first sub enable signal.

18. The electronic device of claim 16, wherein the at least one sub PMIC includes first through n-th sub PMICs configured to communicate with the main PMIC based on a daisy chain scheme, wherein each of the first through n-th sub PMICs further includes a third pin, and wherein the first through n-th sub PMICs are provided with the activation of the first sub enable signal through the second pin and the third pin and enable the second functions sequentially based on the battery voltage.

19. The electronic device of claim 16, further comprising:

a load system including a plurality of second power domains, and wherein the power management device is configured to provide the plurality of output voltages to the plurality of second power domains through the voltage rails.

20. A power management device comprising:

a main power management integrated circuit (PMIC); and at least one sub PMIC configured to communicate with the main PMIC through a dedicated pin, wherein the main PMIC includes a first pin and is configured to:

enable first functions associated with a first initial operation during a stand-by period before generating first output voltages based on a battery voltage; and apply a sub enable signal to the at least one sub PMIC through the first pin based on a power-on signal after completing the first initial operation, wherein the at least one sub PMIC includes a second pin and is configured to:

receive the sub enable signal through the second pin; and enable second functions associated with a second initial operation based on the battery voltage, in response to an activation of the sub enable signal, wherein the main PMIC is configured to:

generate a reference voltage based on the battery voltage in response to the battery voltage reaching a reference level;

activate the sub enable signal in response to the reference voltage reaching a target level and an activation of the power-on signal; and apply the sub enable signal to the at least one sub PMIC through the first pin.

* * * * *